(12) United States Patent
Amagi et al.

(10) Patent No.: US 12,549,054 B2
(45) Date of Patent: Feb. 10, 2026

(54) MOTOR

(71) Applicant: MINEBEA MITSUMI Inc., Nagano (JP)

(72) Inventors: Yuta Amagi, Saihaku-gun (JP); Tsuyoshi Kano, Yasugi (JP); Kumio Masuda, Yonago (JP)

(73) Assignee: MINEBEA MITSUMI Inc., Nagano (JP)

( * ) Notice: Subject to any disclaimer, the term of this patent is extended or adjusted under 35 U.S.C. 154(b) by 465 days.

(21) Appl. No.: 16/629,137

(22) PCT Filed: Jul. 2, 2018

(86) PCT No.: PCT/JP2018/025056
§ 371 (c)(1),
(2) Date: Jan. 7, 2020

(87) PCT Pub. No.: WO2019/013030
PCT Pub. Date: Jan. 17, 2019

(65) Prior Publication Data
US 2020/0136459 A1 Apr. 30, 2020

(30) Foreign Application Priority Data

Jul. 10, 2017 (JP) .................................. 2017-135059

(51) Int. Cl.
*H02K 3/52* (2006.01)
*H02K 21/16* (2006.01)
(52) U.S. Cl.
CPC ............. *H02K 3/522* (2013.01); *H02K 21/16* (2013.01); *H02K 2203/03* (2013.01)
(58) Field of Classification Search
CPC .... H02K 3/522; H02K 21/16; H02K 2203/03; H02K 11/33
(Continued)

(56) References Cited

U.S. PATENT DOCUMENTS 4,806,808 A * 2/1989 Grecksch ............... H05K 1/183
310/67 R
5,990,589 A * 11/1999 Ushikoshi .............. H02K 3/522
310/90
(Continued)

FOREIGN PATENT DOCUMENTS

CN 1185052 A 6/1998
CN 101136563 A 3/2008
(Continued)

OTHER PUBLICATIONS

Notice of Reasons for Refusal dated Feb. 9, 2021 for corresponding Japanese Application No. 2017-135059 and English translation.
(Continued)

*Primary Examiner* — Maged M Almawri
(74) *Attorney, Agent, or Firm* — Chrisman Gallo Tochtrop LLC

(57) ABSTRACT

There is provided an easily manufacturable motor. The motor comprises a conductor (27), a stator including an insulator, a stator core, and a coil, and a substrate (40) including an outer peripheral portion (41) and a surface surrounded with the outer peripheral portion (41). The insulator includes a protruding part (34) extending in a rotary shaft direction. The outer peripheral portion (41) of the substrate (40) includes a recessed part 44 recessed in a radial direction. The protruding part (34) is present inside the recessed part (44). A land (47) is provided at the surface of the substrate (40). The land (47) faces any one of the insulator, the stator core, and the coil in the rotary shaft direction. The conductor (27) is electrically connected to the land (47) by a conductive member.

19 Claims, 18 Drawing Sheets

(58) Field of Classification Search
USPC .................................................. 310/68 R, 71
See application file for complete search history.

(56) References Cited

U.S. PATENT DOCUMENTS

| | | | |
|---|---|---|---|
| 2007/0138883 A1* | 6/2007 | Cho ........................ | H02K 3/522 |
| | | | 310/71 |
| 2007/0290570 A1* | 12/2007 | Okada .................... | H02K 7/003 |
| | | | 310/90 |
| 2008/0054735 A1 | 3/2008 | Yoshida et al. | |
| 2011/0081258 A1 | 4/2011 | Yoshida et al. | |
| 2011/0169358 A1* | 7/2011 | Furukawa .............. | H02K 29/08 |
| | | | 310/89 |
| 2013/0050872 A1* | 2/2013 | Sekii ...................... | H02K 5/225 |
| | | | 310/71 |
| 2013/0234547 A1* | 9/2013 | Oguma ................... | H02K 3/38 |
| | | | 310/71 |
| 2015/0108861 A1* | 4/2015 | Sekii ....................... | H02K 5/22 |
| | | | 310/71 |
| 2015/0180301 A1* | 6/2015 | Kajiyama .............. | H02K 11/40 |
| | | | 310/89 |
| 2016/0146634 A1* | 5/2016 | Elpermann ........... | B60R 16/027 |
| | | | 324/207.15 |
| 2016/0218589 A1* | 7/2016 | Purohit .................. | H02K 5/225 |
| 2016/0276907 A1* | 9/2016 | Kloer ..................... | H02K 15/14 |
| 2017/0222497 A1* | 8/2017 | Yu .......................... | H02K 3/522 |
| 2018/0175694 A1* | 6/2018 | Keil ....................... | H02K 11/33 |
| 2020/0136459 A1* | 4/2020 | Amagi ................... | H02K 11/33 |
| 2022/0235775 A1* | 7/2022 | Iwata ................. | F04D 29/5806 |

FOREIGN PATENT DOCUMENTS

| | | |
|---|---|---|
| CN | 103312071 A | 9/2013 |
| JP | 01-116566 A | 8/1989 |
| JP | 04-068463 U | 6/1992 |
| JP | 2000-037055 A | 2/2000 |
| JP | 2005-341780 A | 12/2005 |

OTHER PUBLICATIONS

International Search Report for corresponding International Application No. PCT/JP2018/025056 mailed Sep. 18, 2018.
Written Opinion for corresponding International Application No. PCT/JP2018/025056 dated Sep. 18, 2018.
English translation of the Written Opinion for International Application No. PCT/JP2018/025056, dated Sep. 18, 2018.
International Preliminary Report on Patentability for Application No. PCT/JP2018/025056, dated Jan. 14, 2020.
First Office Action dated Feb. 26, 2021 for corresponding Chinese Application No. 201880046104.2 and English translation.
Second Office Action dated Oct. 29, 2021 for corresponding Chinese Application No. 201880046104.2 and English translation.
Office Action dated Aug. 15, 2022 in the corresponding Chinese Application No. 201880046104.2 and English translation.
Decision of Rejection dated Feb. 24, 2023 in the corresponding Chinese Application No. 201880046104.2 and English translation.

* cited by examiner

MOTOR

TECHNICAL FIELD

The present invention relates to a motor, and particularly relates to a motor including a substrate connectable with a conductor.

BACKGROUND ART

An example of a motor such as a brushless motor is a motor including a substrate connectable with a conductor. The conductor is connected to a land on the substrate by a conductive member such as, for example, solder or the like.

In Patent Literature 1 described below, there is disclosed a holding device of a driving circuit substrate of a motor, including a structure. In the structure, the driving circuit substrate engages with a substrate holder of an end face insulator provided on a stator iron core.

DOCUMENT LIST

Patent Literature

Patent Literature 1: Japanese Utility Model Application Laid-Open No. H01-116566

SUMMARY OF INVENTION

Technical Problem

It is an object of the present invention to provide an easily manufacturable motor.

Solution to Problem

To achieve the above object, according to a certain aspect of the present invention, a motor comprises a conductor, a stator including an insulator, a stator core, and a coil, and a substrate including an outer peripheral portion and a surface surrounded with the outer peripheral portion, the insulator includes a protruding part extending in a rotary shaft direction, the outer peripheral portion of the substrate includes a recessed part recessed in a radial direction, the protruding part is present inside the recessed part, a land is provided at the surface of the substrate, the land faces any one of the insulator, the stator core, and the coil in the rotary shaft direction, and the conductor is electrically connected to the land by a conductive member.

Preferably, a part of an outer surface of the protruding part extends along an edge of the recessed part.

Preferably, inside the recessed part, a gap surrounded with an outer surface of the protruding part and an edge of the recessed part is present, and the conductor passes through the gap.

Preferably, an occupied region occupied by the protruding part in a region inside the recessed part is larger than an unoccupied region not occupied by the protruding part in the region inside the recessed part.

Preferably, a width of the unoccupied region is smaller than a width of the land in the radial direction.

Preferably, the protruding part and the land are arranged in a circumferential direction, a recess is provided in a top of the protruding part, and a part of the conductor passes through the recess.

Preferably, the recess extends in the circumferential direction.

Preferably, the protruding part is a positioning part of the substrate.

According to these inventions, there can be provided an easily manufacturable motor.

DESCRIPTION OF EMBODIMENTS

Hereinafter, a motor in embodiments of the present invention will be described.

In the following description, a direction parallel to a rotary shaft of the motor may be referred to as a rotary shaft direction. Furthermore, a direction vertical to the rotary shaft may be referred to as a radial direction. Additionally, a rotating direction centered about the rotary shaft may be referred to as a circumferential direction. In addition, the rotary shaft direction may be referred to as an upward-downward direction (a direction of the rotary shaft projecting when seen from a housing of the motor is an upward direction). Furthermore, a plane vertical to the rotary shaft may be referred to as a horizontal plane. Here, the terms "upward-downward", "upward", "downward", "horizontal" and the like are terms to be adopted for convenience when showing directions while focusing only on the motor, and do not limit a direction in equipment equipped with the motor, or a posture when using the motor.

First Embodiment

Figure 1:
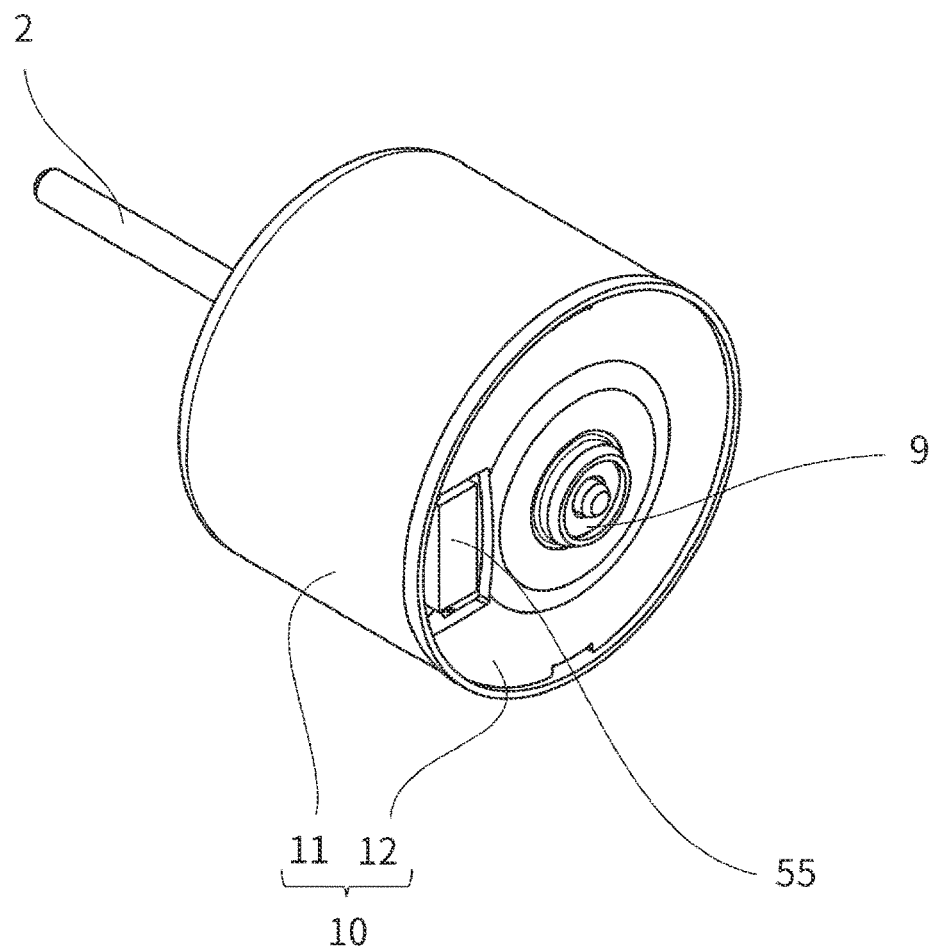
FIG. 1 A perspective view showing a motor according to a first embodiment of the present invention.
Figure 1:
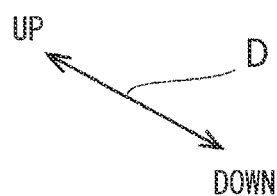
Figure 2:
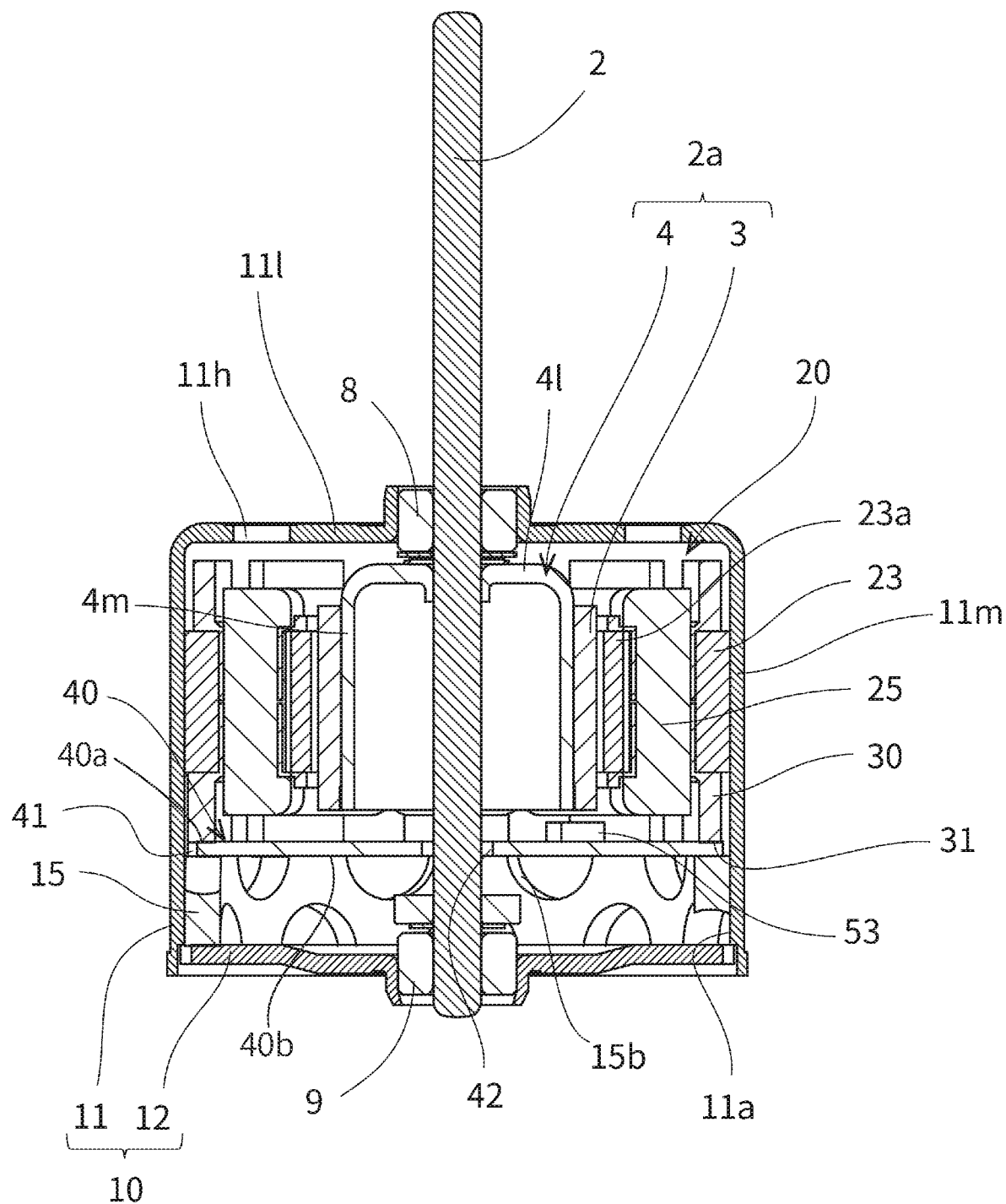
FIG. 2 A side sectional view showing the motor.
Figure 3:
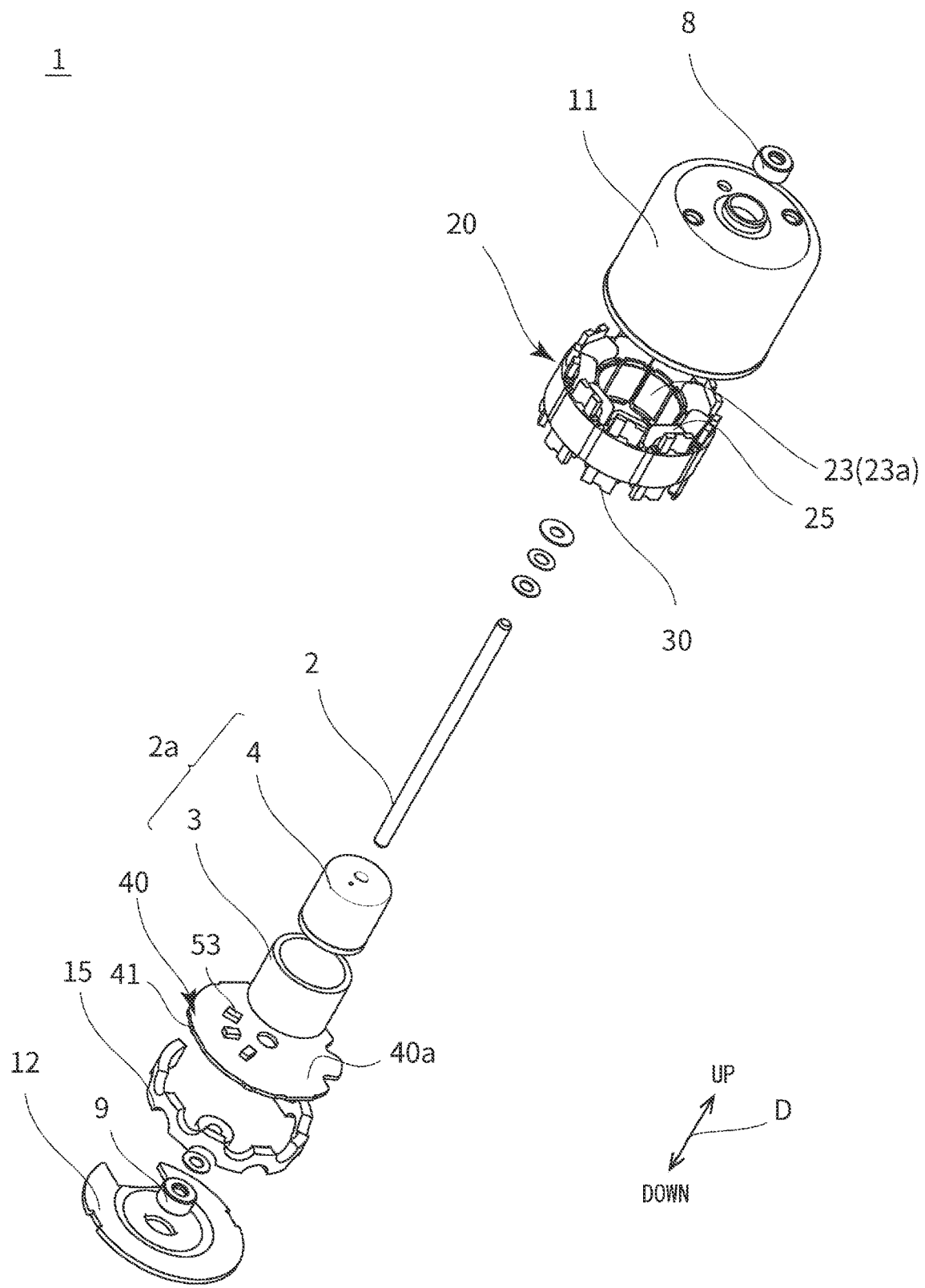
FIG. 3 An exploded upward perspective view of the motor.
Figure 4:
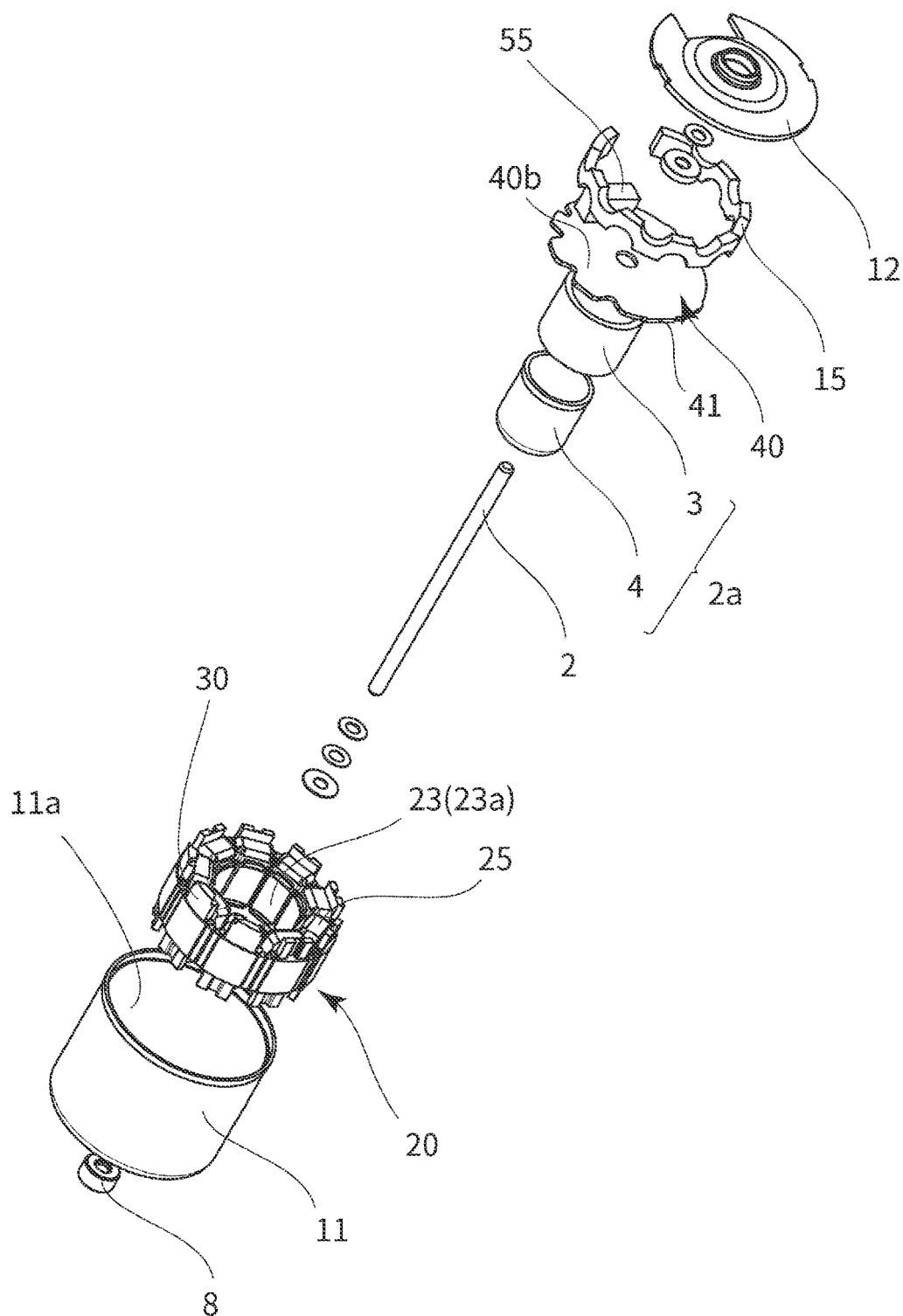
FIG. 4 An exploded downward perspective view of the motor.

FIG. 1 is a perspective view showing a motor 1 according to a first embodiment of the present invention. FIG. 2 is a side sectional view showing the motor 1. FIG. 3 is an exploded upward perspective view of the motor 1. FIG. 4 is an exploded downward perspective view of the motor 1.

In the drawings described below, an arrow D indicates a rotary shaft direction.

The motor 1 is a brushless motor. As shown in FIG. 1, the motor 1 includes a frame 11, a rotary shaft 2, and a cover 12. The motor 1 has a shape. In the shape, the rotary shaft 2 projects in an upward direction (upward) from a columnar housing 10 composed of the frame 11 and the cover 12.

An opening is provided in a part of the cover 12, and the cover is configured with a connector 55 disposed at a lower surface of a substrate 40 (FIG. 2) being exposed through the opening. Consequently, power can be supplied to the motor 1 from outside the housing 10 of the motor 1 via the connector 55. A bearing 9 is disposed in a central portion of the cover 12 (described later).

As shown in FIG. 2, the frame 11 includes a tubular portion 11m and a top surface 11l closing one end, i.e., an upper end of the tubular portion 11m. The frame 11 roughly has a cup shape, i.e., a bottomed tubular shape. The cover 12 is attached to another opening, i.e., a lower opening of the frame 11. The tubular portion of the frame 11 has a round shape when seen from above, i.e., a cylindrical shape.

The rotary shaft 2 extends through the top surface 11l of the frame 11. A bearing 8 is held in the top surface 11l of the frame 11. The rotary shaft 2 is supported by the bearing 8. The rotary shaft 2 is rotatable to the frame 11. The rotary shaft 2 is disposed almost vertically to the top surface 11l of the frame 11. The rotary shaft 2 is located in a center of the tubular portion 11m of the frame 11 in planar view (seen from above). The rotary shaft 2 projects upward from the top surface 11l of the frame 11 as seen from the frame 11.

A hole portion 11h is formed in the top surface of the frame 11. The hole portion 11h is for use, for example, when the motor 1 is attached to and used with an external device. For example, a screw or the like may be attached to the hole portion 11h.

The bearing 9 is disposed in the central portion of the cover 12. The bearing 9 is held by the cover 12. The rotary shaft 2 is supported by the bearing 9. The rotary shaft 2 is supported rotatably to the frame 11 by two bearings of the upper bearing 8 and the lower bearing 9.

As shown in FIG. 2, the motor 1 has an inner space surrounded with the frame 11 and the cover 12. Various components are accommodated in the inner space. In other words, a rotor 2a, an elastic member 15, a stator 20, the substrate 40 and others are arranged inside the frame 11.

The motor 1 is a so-called inner rotor type motor. The annular stator 20 is disposed along an inner peripheral portion 11a of the tubular portion 11m of the frame 11. The stator 20 surrounds the rotary shaft 2. An outer peripheral surface of the rotor 2a (i.e., an outer peripheral surface of a magnet 3) is surrounded with the stator 20.

The rotor 2a includes the magnet 3 and a yoke 4.

In the present embodiment, the yoke 4 has a cup shape including a tubular portion 4m and a top surface 4l covering an upper end of the tubular portion 4m. In other words, the yoke 4 has a tubular shape including the top surface 4l. A lower end of the yoke 4 comprises an opening. The yoke 4 is not limited to the cup shape, and may be, for example, a columnar iron core.

A plane shape of the magnet 3 is annular. In the magnet 3 an inner peripheral surface of the magnet is attached to and facing an outer peripheral surface of the tubular portion of the yoke 4. The outer peripheral surface of the magnet 3 faces an inner peripheral surface of a stator core 23 of the stator 20.

The rotary shaft 2 is disposed almost vertically to the top surface 4l of the yoke 4. The rotary shaft 2 extends through the top surface 4l of the yoke 4, and is fitted in the top surface 4l of the yoke 4. Consequently, the rotary shaft 2 and the rotor 2a are fixed to each other.

Figure 5:
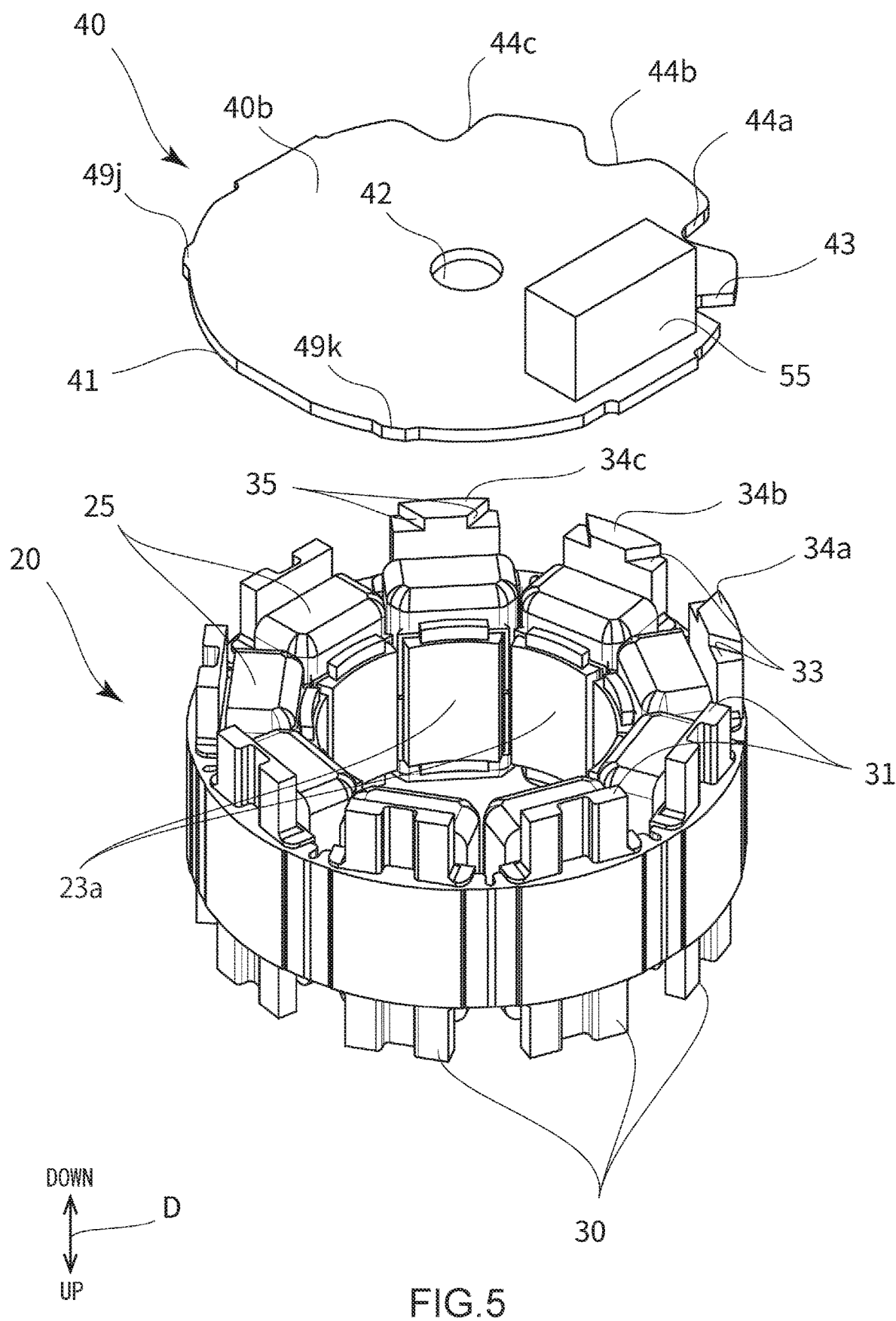
FIG. 5 An exploded downward perspective view showing a structure of a stator and a substrate.

FIG. 5 is an exploded downward perspective view showing a structure of the stator 20 and the substrate 40.

In FIG. 5, drawing of a pattern of a conductor part, a land, various circuit elements and others on the substrate 40, and drawing of an after-mentioned conductor 27 or the like are omitted.

As shown in FIG. 5, the stator 20 includes the stator core 23, a coil 25, and a resin member 30. In the present embodiment, the motor 1 is a three-phase brushless motor, and the number of slots is nine.

The stator core 23 (FIG. 2) is configured, for example, by superimposing steel plates (not shown). The stator core 23 includes teeth 23a extending from a side of the frame 11 (FIG. 2) toward the rotary shaft 2. The teeth 23a face the outer peripheral surface of the magnet 3. In the present embodiment, the stator core 23 is divided into slots of the stator 20, but is not limited thereto, and may integrally include a plurality of slots.

The resin member 30 is attached to the stator core 23. The resin member 30 is an insulating member (insulator) insulating the coil 25 and the stator core 23. Furthermore, the resin member 30 insulates the coil 25 and the frame 11.

The coil 25 is wound around the stator core 23 via the resin member 30. In other words, the coil 25 is wound around the resin member 30. As for each slot, the resin member 30 is attached to the stator core 23, and the coil 25 is wound around the resin member 30.

As shown in FIG. 2, the resin member 30 of each slot extends above and below the stator core 23 in a vicinity of an outer peripheral portion of the stator 20. The resin member 30 is present between the coil 25 and the frame 11, and the coil 25 and the frame 11 are insulated.

Except for a portion, protruding parts 34 (34a, 34b, and 34c) being provided at the portion as described later, lower end faces 31 of the resin members 30 of the respective slots are aligned with positions of the end faces in the rotary shaft direction being about the same. The substrate 40 is disposed at the lower end faces 31 of the resin members 30. In other words, the resin member 30 is present between the stator core 23 and the substrate 40 in the rotary shaft direction.

The substrate 40 is provided in the stator 20. The substrate 40 is disposed at a lower side of the stator 20. The substrate 40 is disposed at the lower end face 31 of the resin member 30. The substrate 40 has an annular contour with a dimension smaller than a dimension of the inner peripheral portion 11a of the tubular portion of the frame 11 in a radial direction. The substrate 40 has an almost round plate shape. The substrate 40 includes an upper surface 40a, a lower surface 40b, and an outer peripheral portion 41. The upper surface 40a and the lower surface 40b are surrounded with the outer peripheral portion 41. A hole portion 42 extending through the rotary shaft 2 is provided in an almost central portion of the substrate 40.

The substrate 40 is disposed in an almost vertical posture to the rotary shaft 2. In other words, the upper surface 40a of the substrate 40 is almost vertical to the rotary shaft 2. The upper surface 40a of the substrate 40 is a surface facing the rotor 2a.

A control circuit to drive the motor 1 is provided on the substrate 40. The substrate 40 sends a driving current to each coil 25 of the motor 1 at an interval depending on rotation of the rotor 2a, to drive the motor 1.

A sensor 53 is provided on the substrate 40. In the present embodiment, the sensor 53 is a Hall element. The sensor 53 is provided for each of three phases. In other words, three sensors 53 are provided. The sensor 53 is disposed on the upper surface 40a of the substrate 40. The sensor 53 detects a magnetic field. The sensor 53 mainly detects a position of a magnetic pole of the magnet 3. In other words, the sensor 53 detects a rotational position of the rotor 2a. As will be described later, the sensor 53 is positioned to be located at a predetermined position, and detection accuracy by the sensor 53 becomes excellent.

A connector 55 is provided on the lower surface 40b of the substrate 40. Drawing of a specific shape of the connector 55 is omitted. The connector 55 connects a power source line or a signal line from external equipment to the control circuit on the substrate 40.

As shown in FIG. 3, the elastic member 15 is disposed between the lower surface 40b of the substrate 40 and the cover 12. The elastic member 15 is made of a resin having elasticity, e.g., a natural rubber or a synthetic rubber. The elastic member 15 having an annularly curved state contacts the vicinity of the outer peripheral portion 41 of the substrate 40. The elastic member 15 is brought from a natural state (no load is added from outside in the state) to a compressed state in the rotary shaft direction between the substrate 40 and the cover 12. Consequently, the substrate 40 is pressed against the stator 20 by the elastic member 15. The substrate 40 attached to the stator 20 is fixed in the rotary shaft direction.

As shown in FIG. 2, a plurality of recessed parts 15b dented in the rotary shaft direction are provided in the elastic member 15. Consequently, a spring constant of the elastic member 15 in the rotary shaft direction decreases as compared with a case of not providing any recessed parts 15b. The substrate 40 is pressed upward with a force having an appropriate magnitude by the elastic member 15. Positions of the recessed parts 15b correspond to positions of the land, the conductor, the circuit element and others provided at the lower surface 40b of the substrate 40. The elastic member 15 does not contact the land, the conductor, the circuit element and others present at the lower surface 40b of the substrate 40.

Figure 6:
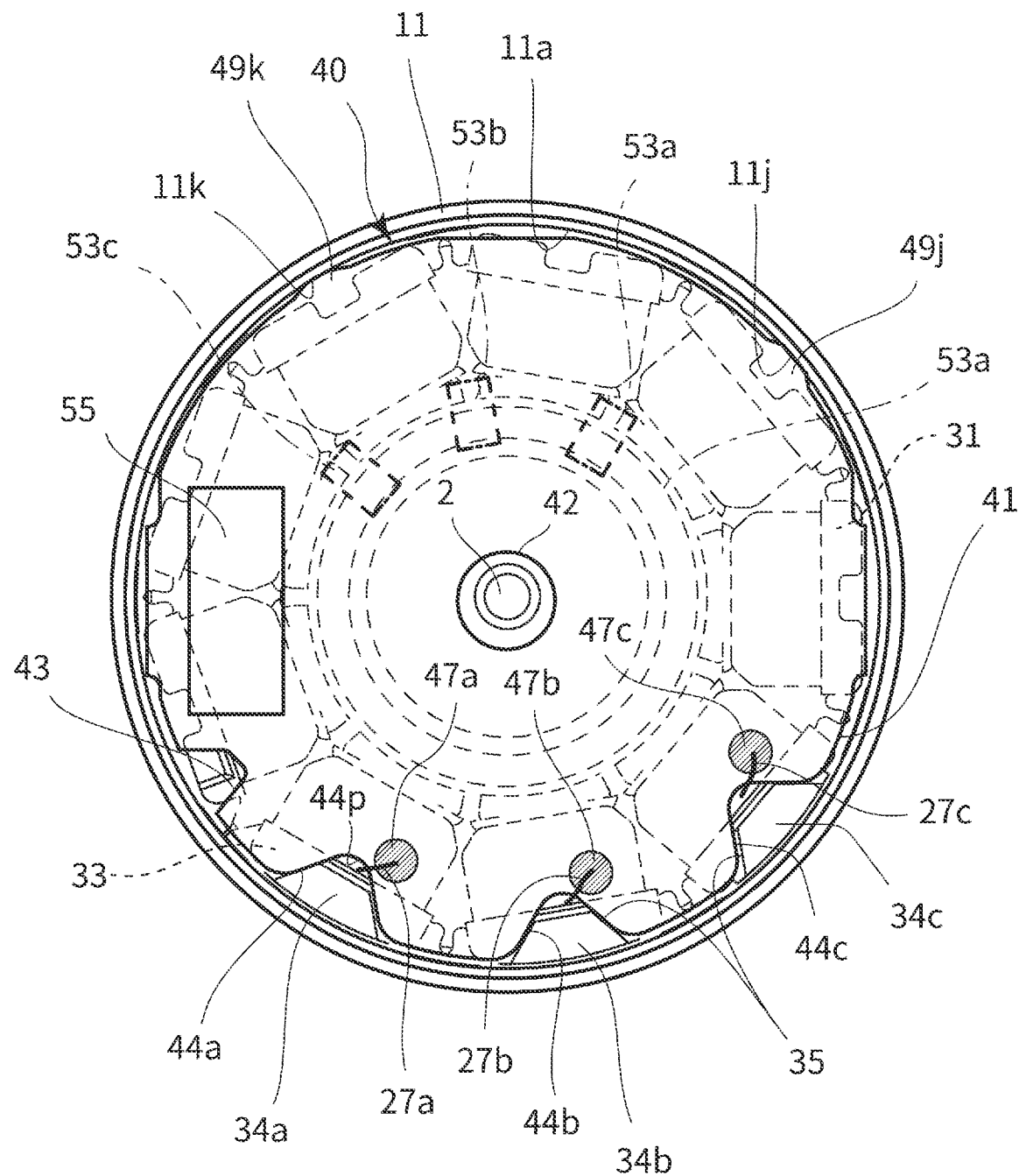
FIG. 6 A bottom view showing an attaching structure of the substrate of the motor.

FIG. 6 is a bottom view showing an attaching structure of the substrate 40 of the motor 1.

In FIG. 6, drawing of the pattern of the conductor portion, the land, various circuit elements and others on the substrate 40 is omitted except for a part of the drawing. In FIG. 6, the motor 1 without the cover 12 and the elastic member 15 being attached is shown, and portions of the stator 20 and the rotor 2a present behind the substrate 40 but not appearing are shown with broken lines. Furthermore, in FIG. 6, the sensors 53 (53a, 53b and 53c) on the upper surface 40a of the substrate 40 are shown with broken lines.

As shown in FIG. 6, three lands 47 (47a, 47b and 47c) are provided on the lower surface 40b of the substrate 40. Three lands 47 are provided to correspond to three phases of the motor 1. In the present embodiment, the land 47a corresponds to a U-phase, the land 47b corresponds to a V-phase, and the land 47c corresponds to a W-phase, respectively.

Each land 47 is connected to an end portion of a conductor 27 (27a, 27b and 27c) connected to the coil 25 of each corresponding phase. In the present embodiment, the conductor 27a corresponds to the U-phase, the conductor 27b corresponds to the V-phase, and the conductor 27c corresponds to the W-phase, respectively. Furthermore, another end portion (not shown) of the conductor 27 of the coil 25 of each phase is connected to an unshown common potential, for example, a land (not shown) of the common potential provided on the lower surface 40b of the substrate 40. Thus, the conductor 27 of the coil 25 of each phase is connected to the land 47. Consequently, the coil 25 can be energized from the control circuit on the substrate 40.

In the present embodiment, the sensor 53a corresponds to the U-phase, the sensor 53b corresponds to the V-phase, and the sensor 53c corresponds to the W-phase, respectively. As shown in FIG. 6, three sensors 53 are arranged via each space of 40 degrees in a circumferential direction. In other words, the three sensors 53 are arranged side by side in the circumferential direction at the same intervals as those of the slots of stator 20 in the circumferential direction. The respective sensors 53 are arranged at positions superimposed on the magnet 3 in an axial direction. In other words, each sensor 53 is disposed at a position away from the rotary shaft 2 by a distance about the same as a radius of the magnet 3. Each sensor 53 is positioned in the circumferential direction by positioning the substrate 40 as described later. Consequently, a current can be sent to the coil 25 of each phase at an appropriate timing depending on change in a signal to be output from each sensor 53 with the rotation of the rotor 2a, and the motor 1 can be efficiently driven.

As shown in FIG. 6, one common line wiring part 43 and three recessed parts 44 (44a, 44b and 44c) are provided in the outer peripheral portion 41 of the substrate 40. The common line wiring part 43 is a region provided in a part of the outer peripheral portion 41 and recessed in the radial direction. A gap between the common line wiring part 43 and the inner peripheral portion 11a of the frame 11 is, for example, a wiring path of a common line.

Three recessed parts 44 are each a region provided in a part of the outer peripheral portion 41 and recessed in the radial direction. A recess of each recessed part 44 in the circumferential direction decreases in dimension as being closer to the rotary shaft 2. In the present embodiment, each recessed part 44 has a tapered shape. In the tapered shape, the recess of each recessed part 44 in the circumferential direction decreases in dimension as being closer to the rotary shaft 2. In other words, an end portion of each recessed part 44 has a contour linearly extending from the outer peripheral portion 41 to a vicinity of a tip end portion 44p close to the rotary shaft 2, and has a shape symmetric to a straight line extending from the rotary shaft 2 to the tip end portion 44p as seen from the rotary shaft direction. In other words, each recessed part 44 roughly has a shape of a fan-shaped portion centered about the vicinity of the tip end portion 44p, the fan-shaped portion being cut from the outer peripheral portion 41.

In the present embodiment, a rounded portion (a protruding round corner portion) is provided in a corner portion between the contour of the recessed part 44 and another region of the outer peripheral portion 41. Furthermore, in the recessed part 44, a rounded portion (a recessed round corner portion) is also provided between two radiuses forming a fan shape, i.e., between two line segments forming a tapered shape in the contour of the recessed part 44, and this portion is the tip end portion 44p of the recessed part 44 close to the rotary shaft 2. Thus, a curved recessed round corner portion is provided between two line segments forming the tapered shape. Consequently, even when the conductor 27 wired in a vicinity of this position contacts an edge of the recessed part 44 as described later, the conductor 27 is hard to damage.

Three recessed parts 44 are provided to correspond to three phases of the motor 1. In the present embodiment, the recessed part 44a corresponds to the U-phase, the recessed part 44b corresponds to the V-phase, and the recessed part 44c corresponds to the W-phase, respectively. The three recessed parts 44 are arranged side by side in the circumferential direction at the same intervals as those of the slots of stator 20 in the circumferential direction. The respective recessed parts 44 are arranged at positions corresponding to three slots of the stator 20 adjacent to one another in the circumferential direction. The three recessed parts 44 are arranged via each space of 40 degrees in the circumferential direction.

In the present embodiment, the recessed part 44 corresponding to a specific phase is provided at a position of the outer peripheral portion 41 at a side opposite to the sensor 53 corresponding to the phase via the rotary shaft 2. In other words, the sensor 53 corresponding to a specific phase and the recessed part 44 corresponding to the specific phase are arranged at the positions separated by a space of 180 degrees in the circumferential direction. In other words, the sensor 53a and the recessed part 44a corresponding to the U-phase are arranged at positions 180 degrees away from each other in the circumferential direction. The sensor 53b and the recessed part 44b corresponding to the V-phase are arranged at positions 180 degrees away from each other in the circumferential direction. The sensor 53c and the recessed part 44c corresponding to the W-phase are arranged at positions 180 degrees away from each other in the circumferential direction.

As shown in FIG. 6, the land 47 corresponding to a specific phase is provided in a vicinity of the recessed part 44 corresponding to the phase. Each land 47 is provided in a vicinity of the tip end portion 44p of each recessed part 44.

Furthermore, a contact portion 49 contacting the inner peripheral portion 11a of the frame 11 is provided in the outer peripheral portion 41 of the substrate 40. In the present embodiment, the contact portion 49 comprises two projecting portions 49j, 49k. The substrate 40 is attached to the motor 1 with the contact portion 49 contacting the inner peripheral portion 11a of the frame 11. In other words, a part of the inner peripheral portion 11a of the frame 11 comprises contacted portions 11j, 11k contacted by the contact portion 49. The inner peripheral portion 11a of the frame 11 includes the contacted portions 11j, 11k contacted by the two projecting portions 49j, 49k, respectively. The contacted portions 11j, 11k are inner peripheral surfaces curved along the outer peripheral portion 41 of the substrate 40 in the circumferential direction.

Relative to an annular contour of the outer peripheral portion 41 of the substrate 40, each of the projecting portions 49j, 49k is formed to project toward an inner peripheral portion 11a side of the frame 11. The projecting portion 49j and the projecting portion 49k are present at positions away from each other in the circumferential direction. The projecting portions 49j, 49k are unevenly distributed in the circumferential direction. The projecting portions 49j, 49k and the recessed parts 44 are unevenly distributed in regions different from each other in the circumferential direction. In other words, the projecting portions 49j, 49k are present at positions comparatively away from the three recessed parts 44 in the circumferential direction.

Specifically, as shown in FIG. 6, the projecting portion 49j is disposed via a space of, for example, about 80 degrees away from the projecting portion 49k in the circumferential direction. The recessed part 44c closest to the projecting portion 49j is disposed via a space of, for example, 80 degrees away from the projecting portion 49j in the circumferential direction. Furthermore, the recessed part 44a closest to the projecting portion 49k is disposed via a space of, for example, 120 degrees away from the projecting portion 49k in the circumferential direction.

As shown in FIG. 5, in the present embodiment, three protruding parts 34 (34a, 34b and 34c) extending in the rotary shaft direction are provided in the resin member 30. The three protruding parts 34 are provided in the resin members 30 of three slots, and extend downward.

In a lower portion of the resin member 30, each protruding part 34 being provided in the lower portion, there is provided a stepped surface 33 present at a position about the same as a position of the lower end face 31 of the other resin member 30 in the rotary shaft direction. The protruding part 34 is a projecting portion projecting downward from the stepped surface 33.

Three protruding parts 34 are provided at positions corresponding to three recessed parts 44 of the substrate 40. In other words, the protruding parts 34 are provided in the resin members 30 of three slots adjacent to one another in the circumferential direction. An outer peripheral surface of each protruding part 34 includes a surface curved along the inner peripheral portion 11a of the frame 11, a flat surface directed inward in the radial direction, and two flat surfaces each connecting both the surfaces to each other and directed in both the circumferential direction and the radial direction, respectively. Assuming the surface curved along the inner peripheral portion 11a of the frame 11 among the surfaces is a flat surface, the protruding part 34 can be considered to have a trapezoidal outer surface as seen from the rotary shaft direction. In other words, the protruding part 34 has an almost trapezoidal shape having a long side slightly curved along the inner peripheral portion 11a of the frame 11 in plan view. A dimension of the protruding part 34 in the radial direction is slightly smaller than a dimension of the recessed part 44 in the radial direction.

Two outer surfaces 35 directed in both the circumferential direction and the radial direction among the outer surfaces of the protruding part 34 are inclined as seen from the rotary shaft direction. Each protruding part 34 in the circumferential direction decreases in dimension as being closer to the rotary shaft 2. In the present embodiment, each protruding part 34 has a tapered shape. In the tapered shape, the protruding part in the circumferential direction decreases in dimension as being closer to the rotary shaft 2. In other words, the two outer surfaces 35 of each protruding part 34 have a contour linearly extending from the surface curved along the inner peripheral portion 11a of the frame 11 to the flat surface directed inward in the radial direction as seen from the rotary shaft direction. The protruding part 34 has a shape symmetric to a straight line passing the rotary shaft 2 as seen from the rotary shaft direction.

As shown in FIG. 6, the protruding part 34 is present inside the recessed part 44 when the substrate 40 is disposed at the lower end face 31 and the stepped surface 33. The two outer surfaces 35 of the protruding part 34 extend along edges of the recessed part 44.

Figure 7:
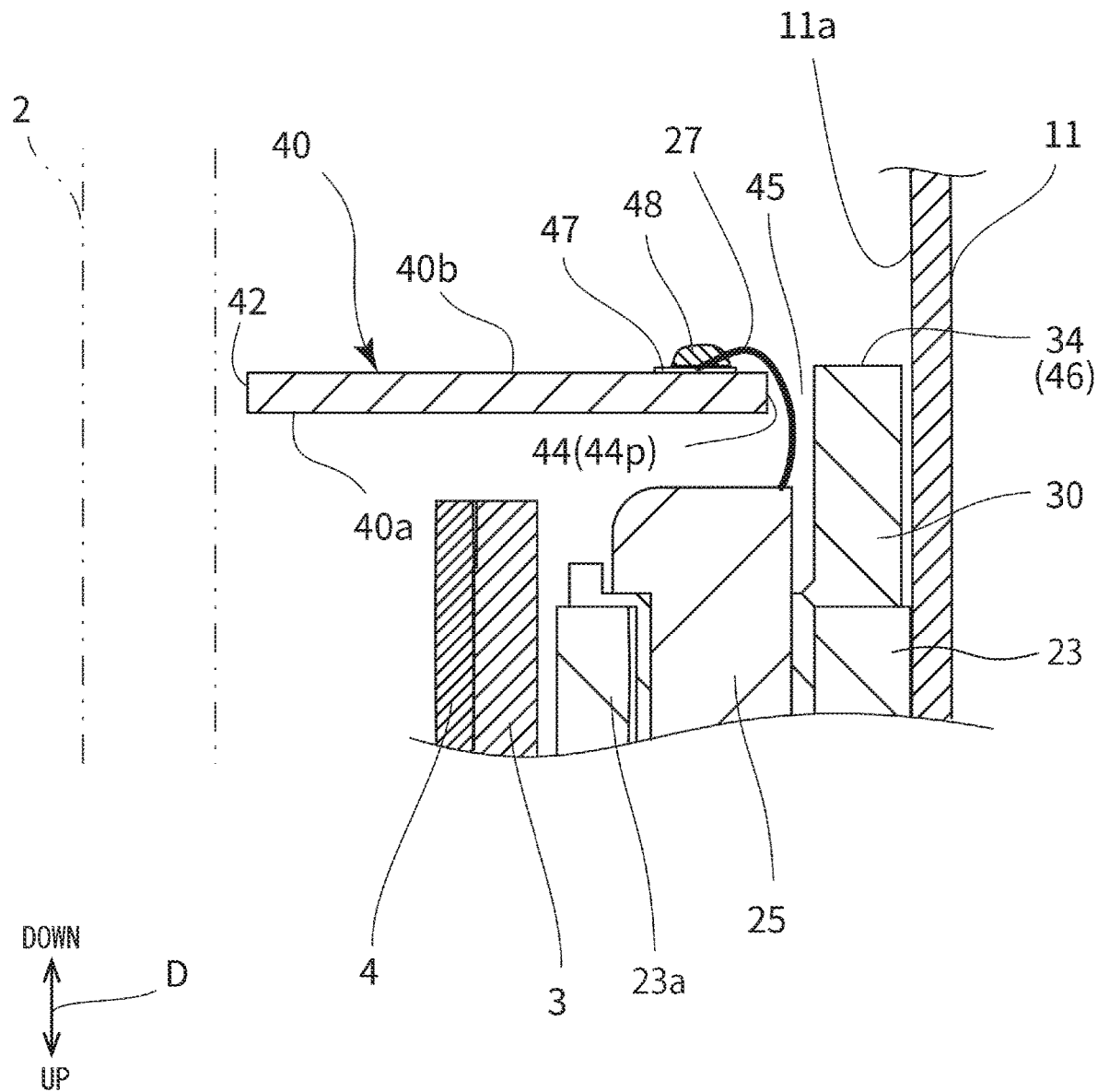
FIG. 7 An end face view showing a schematic structure of a portion, a recessed part being provided at the portion.
Figure 8:
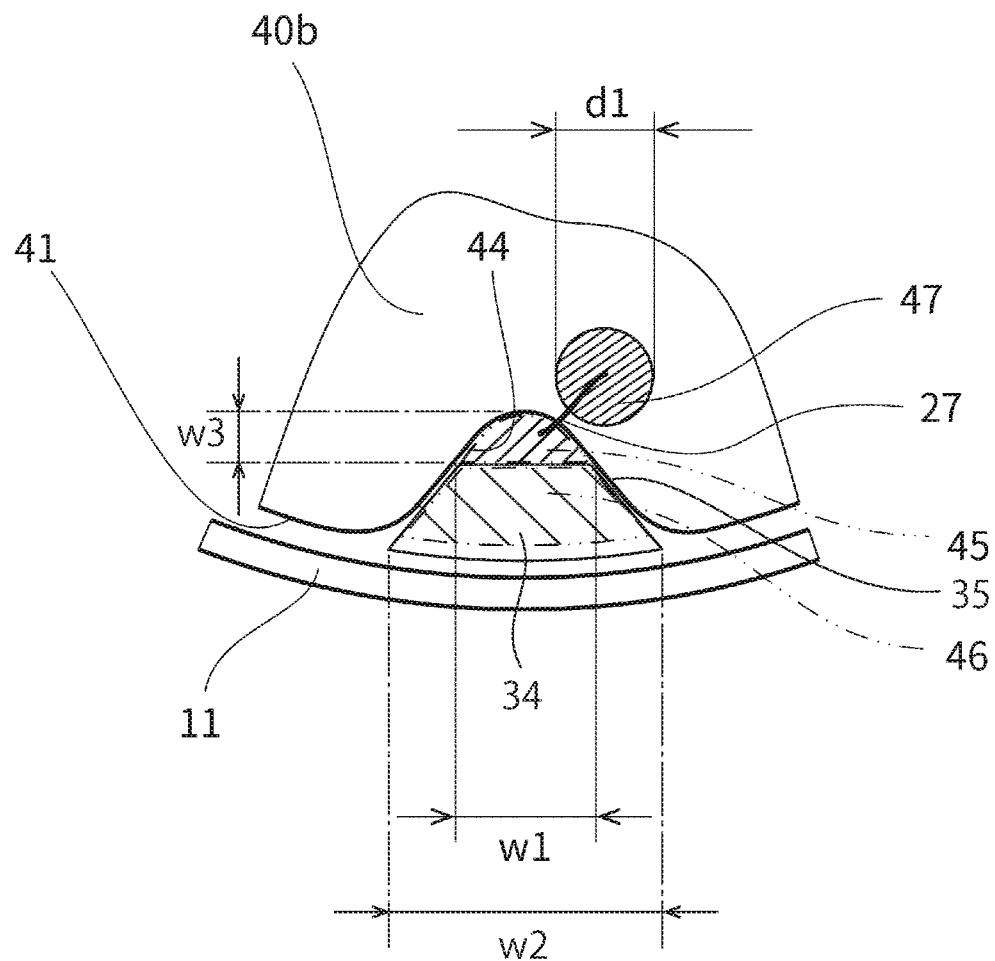
FIG. 8 A partially enlarged view showing the portion, the recessed part being provided at the portion, when seen from below.

FIG. 7 is an end face view showing a schematic structure of a portion, the recessed part 44 being provided at the portion. FIG. 8 is a partially enlarged view showing the portion, the recessed part 44 being provided at the portion, when seen from below.

FIG. 7 and FIG. 8 show the motor 1 in a state without the cover 12 and the elastic member 15 being attached.

As shown in FIG. 7, a lower end portion of the protruding part 34 is present below the lower surface 40b of the substrate 40. An inner end portion of the recessed part 44 is on an inner side of the outer peripheral portion 41 of the substrate 40 in a region without the recessed part 44. Since the protruding part 34 is present inside the recessed part 44, displacement of the substrate 40 in the circumferential direction is regulated by the protruding part 34. In other words, since the protruding part 34 is located inside the recessed part 44, a position of the substrate 40 to the stator 20 in the circumferential direction is regulated. The protruding part 34 serves as a positioning part of the substrate 40. The substrate 40 is held by the protruding part 34 to not rotate.

Here, as shown in FIG. 8, an opening width w2 of the recessed part 44 directed in the radial direction in the vicinity of the outer peripheral portion 41 (here the width in a direction vertical to the radial direction when seen from the rotary shaft direction) is larger than a width w1 of the protruding part 34 in a region close to the rotary shaft 2. The region close to the rotary shaft 2 of the protruding part 34 is in contact with or close to the edge of the recessed part 44 inside the recessed part 44. Consequently, a gap 45 surrounded with the outer surface of the protruding part 34 and the edge of the recessed part 44 (one example of an unoccupied region) is formed inside the recessed part 44. The region inside the recessed part 44 close to the frame 11 is an occupied region 46 occupied by the protruding part 34. Since the outer surface 35 of the protruding part 34 extends along the edge of the recessed part 44, the occupied region 46 occupies a large part of the region of the recessed part 44 close to the frame 11 when seen from the rotary shaft direction. In the present embodiment, an area of the occupied region 46 is larger than an area of the gap 45 not occupied by the protruding part 34 in the region inside the recessed part 44 when seen from the rotary shaft direction.

Here, a width of the gap 45 is smaller than a width of the land 47 in the radial direction. A width w3 of the gap 45 in the radial direction is smaller than a width d1 of the land 47. In other words, a size of the gap 45 connecting a lower space of the substrate 40 to an upper space of the substrate 40 is comparatively small.

As shown in FIG. 7, the conductor 27 extends from the lower surface 40b of the substrate 40 through the gap 45 toward the stator 20. The end portion of the conductor 27 is electrically connected to the land 47 by a conductive member 48. The conductive member 48 is, for example, solder.

Thus, in the first embodiment, a large part of a region including the recessed part 44 of the substrate 40 is closed with the protruding part 34 when the substrate 40 is disposed in the stator 20. Consequently, in a manufacturing process of the motor 1, for example, when the conductor 27 is connected to the land 47, foreign matter is prevented from passing a region between the recessed part 44 and the inner peripheral portion 11a of the frame 11 and entering the space above the substrate 40. Therefore, the motor 1 can be easily manufactured. In the space above the substrate 40, the rotor 2a is disposed close to the stator 20. When the foreign matter is present in this space, driving of the motor 1 may be hindered. Since the foreign matter is prevented from entering a vicinity of the rotor 2a, the driving of the motor 1 can be prevented from being hindered.

In the first embodiment, the outer surface 35 of the protruding part 34 extends along the edge of the recessed part 44, the occupied region 46 is comparatively large, and the gap 45 is comparatively small. Therefore, the foreign matter is prevented from entering the space above the substrate 40. When the conductor 27 is connected to the land 47, the conductive member 48 becomes like a lump having a width as large as the width of the land 47. The width of the gap 45 is smaller than the width of the land 47 in the radial direction. Therefore, for example, even when the conductive member 48 drops from the land 47 during an operation of connecting the conductor 27 to the land 47, the dropped conductive member 48 can be prevented from entering the space above the substrate 40. When the solder is used as the conductive member 48, the conductor 27 is soldered to the land 47. In this case, when the solder is not bonded to the land 47, a so-called solder ball may be generated. In this case, however, the solder ball is prevented from entering the space above the substrate 40. Therefore, the motor 1 can be more easily manufactured.

Here, in the first embodiment, the contact portion 49 is provided in the outer peripheral portion 41 of the substrate 40, and the contact portion 49 contacts the inner peripheral portion 11a of the frame 11. Consequently, the substrate 40 is tensioned to the radial direction.

Figure 9:
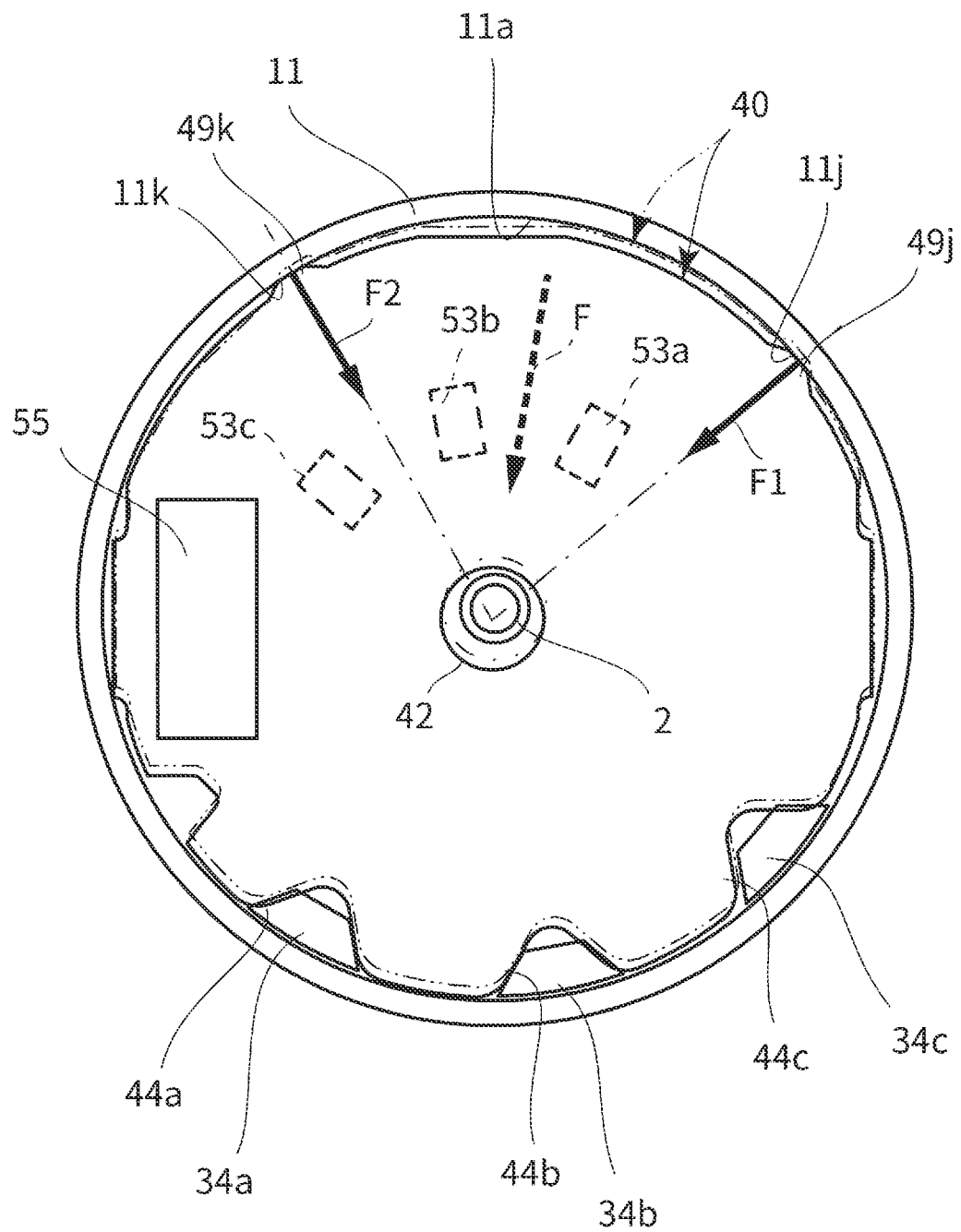
FIG. 9 A bottom view showing a relation among the substrate, a frame, and a protruding part.

FIG. 9 is a bottom view showing a relation among the substrate 40, the frame 11, and the protruding part 34.

FIG. 9 shows the rotary shaft 2, the substrate 40, the frame 11, and the resin member 30. A two-dot chain line virtually shows a position of the substrate 40 when the contact portion 49 does not contact the frame 11.

As shown in FIG. 9, in the first embodiment, the contact portion 49 of the substrate 40 contacts the contacted portions 11j, 11k of the inner peripheral portion 11a of the frame 11. Consequently, a biasing force (shown with an arrow F1, F2) by the frame 11 acts on the substrate 40. The arrow F1 shows the biasing force generated when the projecting portion 49j contacts the contacted portion 11j. The arrow F2 shows the biasing force generated when the projecting portion 49k contacts the contacted portion 11k. The respective biasing forces act in the radial direction.

Since two projecting portions 49j, 49k are provided, the biasing force acting on the substrate 40 is obtained by synthesizing the above two biasing forces (shown with an arrow F). The projecting portions 49j, 49k are present at positions comparatively away from three recessed parts 44 in the circumferential direction. Consequently, the biasing force acts on the substrate 40 from a side provided with the projecting portions 49j, 49k toward a side provided with the recessed part 44. In other words, the substrate 40 is biased by the frame 11, and the recessed part 44 is pushed toward the protruding part 34 of the resin member 30. The substrate 40 is biased in the outer peripheral portion 41 of the substrate 40, and accordingly, the projecting portions 49j, 49k project relative to the annular contour of the outer peripheral portion 41. Since these projecting portions 49j, 49k contact the inner peripheral portion 11a of the frame 11, the substrate 40 is displaced in a direction away from the contacted portions 11j, 11k. In other words, the substrate 40 is present at a position biased in the radial direction toward a part of the frame 11.

Thus, in the first embodiment, the contact portion 49 contacts the contacted portions 11j, 11k, and accordingly, the substrate 40 is biased in the radial direction. A position of the sensor 53 on the substrate 40 is preset to dispose the sensor 53 at an appropriate position with the substrate 40 being biased. Therefore, the sensor 53 can be disposed at a desired position.

When the sensor 53 is provided on the substrate 40, the substrate 40 is not positioned to the stator 20, or the substrate 40 is not positioned to the frame 11 in the circumferential direction and the radial direction. In this case, the position of the sensor 53 shifts from the desired position, and the sensor 53 may not be provided at the appropriate position. In the present embodiment, since the substrate 40 can be positioned, the sensor 53 can be disposed at a desired position. Specifically, the sensor 53 being a Hall element can be disposed over the magnet 3 of the rotor 2a, and the sensor 53 can efficiently detect a magnetic flux of the magnet 3. Detection accuracy of a rotational speed of the motor 1 can improve, and hence, a performance of the motor 1 can improve.

The substrate 40 is biased by the frame 11 and pushed against the protruding part 34 of the resin member 30. Therefore, the substrate 40 can be positioned to the stator 20. The protruding part 34 is located inside the recessed part 44 of the substrate 40. Consequently, the substrate 40 is positioned to the stator 20 in the circumferential direction.

The recessed part 44 has a tapered shape. In the tapered shape, the recess of each recessed part 44 decreases in dimension in the circumferential direction as being closer to the rotary shaft 2. Therefore, the protruding part 34 can be located inside the recessed part 44, and the substrate 40 can be easily disposed at the lower side of the stator 20. Furthermore, the substrate 40 is biased toward the protruding part 34 with a part of the protruding part 34 contacting the edge of the recessed part 44, and hence, the substrate 40 can be more accurately positioned in the circumferential direction. Furthermore, in the first embodiment, the protruding part 34 also has the tapered shape corresponding to the shape of the recessed part 44. Consequently, the substrate 40 is positioned in the radial direction and the circumferential direction with the substrate 40 being biased and the recessed part 44 being pushed into the protruding part 34.

In the stator 20, when the coil 25 is wound around the resin member 30, the resin member 30 is slightly deformed as compared with when the coil 25 is not wound. When the coil 25 is wound, the lower end portion of the resin member 30 is slightly bent and curved toward the rotary shaft 2. As to the resin member 30 bent in this way, the substrate 40 is biased toward a direction almost reverse to a deforming direction. Consequently, the substrate 40 can be firmly positioned by use of elasticity of the resin member 30 and rattle or the like is not easily generated.

In the first embodiment, the recessed part 44c closest to the projecting portion 49j is disposed via the space of 80 degrees away from the projecting portion 49j in the circumferential direction, and the recessed part 44a closest to the projecting portion 49k is disposed via the space of 120 degrees away from the projecting portion 49k in the circumferential direction. In other words, when seen from the rotary shaft 2, a direction of providing three recessed parts 44 shifts slightly from a direction of biasing the substrate 40. When seen from the rotary shaft 2, the substrate 40 is biased toward a portion between the recessed part 44a and the recessed part 44b among the three recessed parts 44 equally spaced from one another in the circumferential direction. Thus, the biasing direction of the substrate 40 (the direction shown with the arrow F in FIG. 9) slightly shifts from a direction toward a center of the three recessed parts 44. Consequently, the protruding part 34 contacts at least a part of the edge of the recessed part 44, to position the substrate 40.

The projecting portion 49k contacts the contacted portions 11j, 11k of the frame 11, and consequently the substrate 40 may be biased in the radial direction and the circumferential direction, or may be biased in the circumferential direction. For example, a contact surface between the projecting portion 49k and the frame 11 may be tilted to a surface vertical to the radial direction, and consequently the biasing force to the substrate 40 in the circumferential direction is applied, and the protruding part 34 is pushed into the recessed part 44.

Furthermore, the number or shape of the projecting portions 49k, the number or shape of the recessed parts 44, the position of the projecting portion 49k or the like is not limited to this embodiment, and various modes can be adopted.

Figure 10:
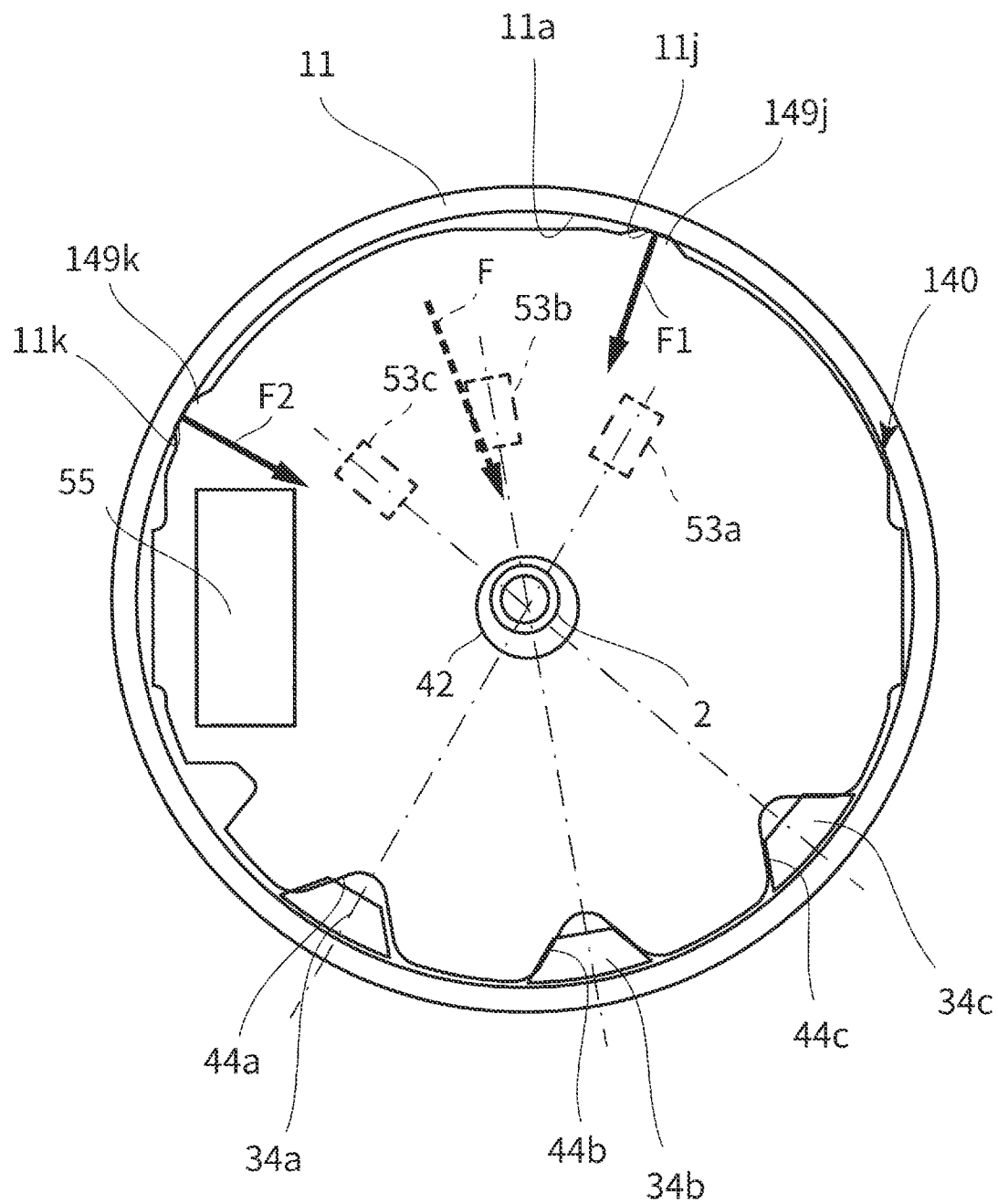
FIG. 10 A bottom view showing a configuration of a substrate according to a first variant of the first embodiment.

FIG. 10 is a bottom view showing a configuration of a substrate 140 according to a first variant of the first embodiment.

FIG. 10 shows the substrate 140 according to the present variant together with a rotary shaft 2, a frame 11 and a resin member 30 in the same manner as in FIG. 9 described above. A configuration similar to the above-described first embodiment is denoted with the same reference sign.

As shown in FIG. 10, the substrate 140 has contact portions 149 (a projecting portion 149j and a projecting portion 149k) different in position from the contact portion 49 of the above-described substrate 40. Another configuration of the substrate 140 is similar to the above-described substrate 40. In other words, the projecting portion 149j is disposed via a space of about 110 degrees from a recessed part 44c closest to the projecting portion 149j in a circumferential direction, and the projecting portion 149k is disposed via a space of about 90 degrees from a recessed part 44a closest to the projecting portion 149k in the circumferential direction. In other words, when seen from the rotary shaft 2, a direction of providing three recessed parts 44 slightly shifts from a direction of biasing the substrate 140. When seen from the rotary shaft 2, the substrate 140 is biased toward a portion between a recessed part 44b and the recessed part 44c among the three recessed parts 44. The projecting portions 149j, 149k have such a positional relation with the recessed part 44, but the substrate 140 can be positioned in the same manner as described above.

Figure 11:
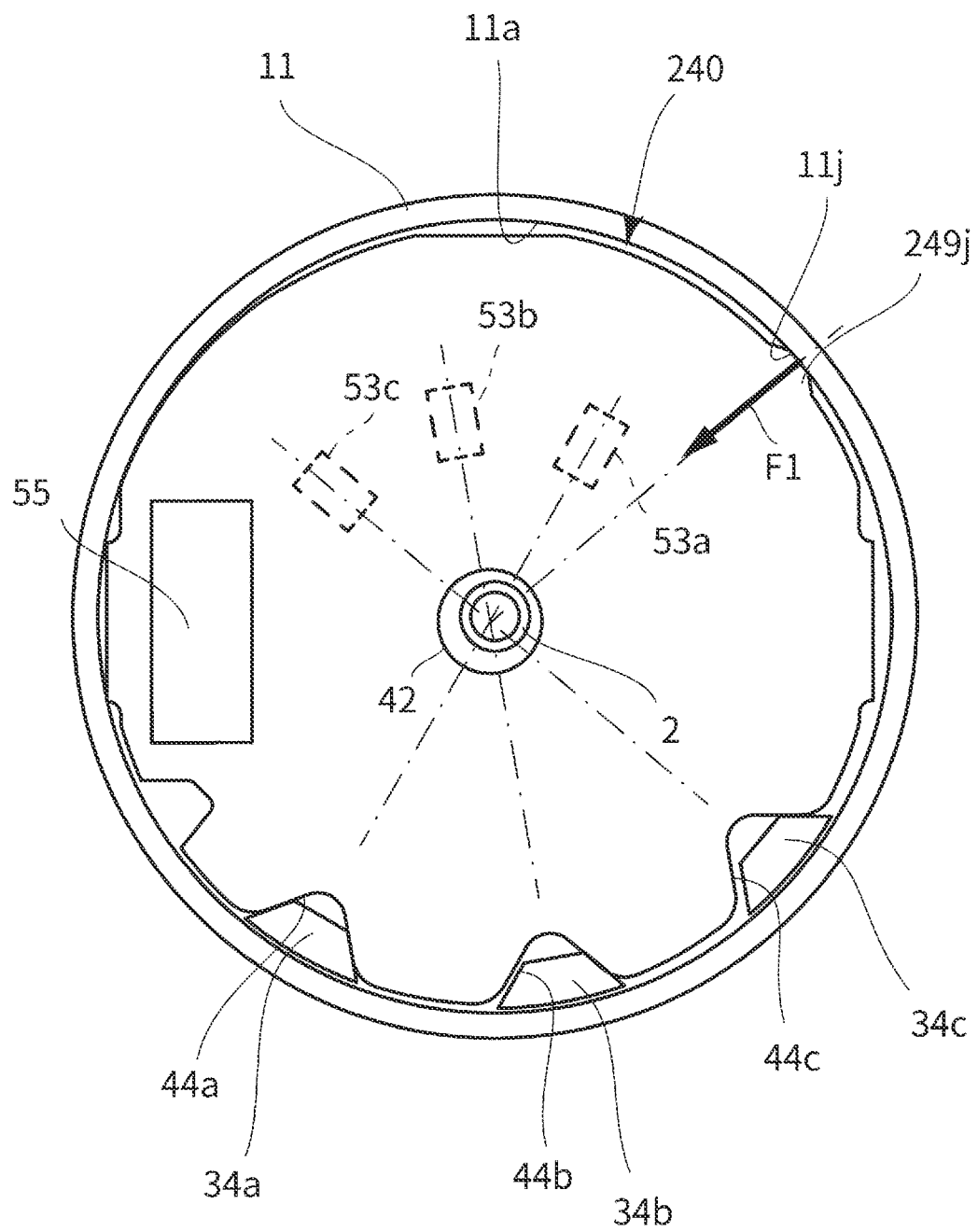
FIG. 11 A bottom view showing a configuration of a substrate according to a second variant of the first embodiment.

FIG. 11 is a bottom view showing a configuration of a substrate 240 according to a second variant of the first embodiment.

FIG. 11 also shows the substrate 240 according to the present variant together with a rotary shaft 2, a frame 11 and a resin member 30 in the same manner as in FIG. 9 described above. A configuration similar to the above-described first embodiment is denoted with the same reference sign.

As shown in FIG. 11, the substrate 240 has only one contact portion 249 (a projecting portion 249j). Another configuration of the substrate 240 is similar to the above-described substrate 40. The projecting portion 249j is disposed via a space of 80 degrees away from a recessed part 44c closest to the projecting portion 249j in a circumferential direction. Consequently, in the present variant, a tensioning force acts on the substrate 240 from the projecting portion 249j toward the rotary shaft 2 (shown with an arrow F1).

In the present variant, the tensioning force includes a component to tension the substrate 240 to a direction to move the recessed part 44c away from a protruding part 34c.

However, the substrate 240 is slightly displaced in the circumferential direction as protruding parts 34a, 34b are pushed into the recessed parts 44a, 44b different from the recessed part 44c by the tensioning force, and the recessed part 44c is pushed into the protruding part 34c. Therefore, the substrate 240 can be positioned in the same manner as described above.

Figure 12:
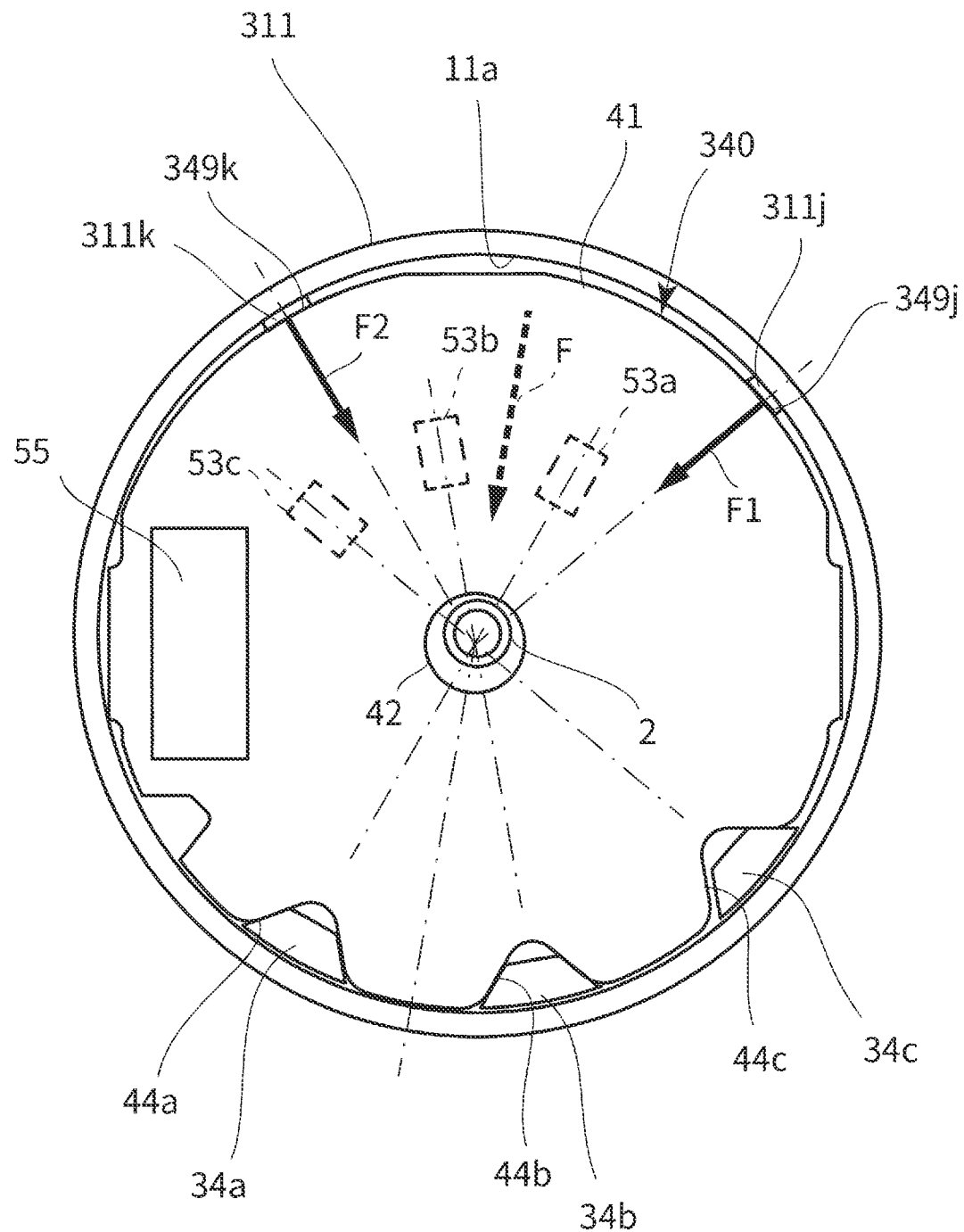
FIG. 12 A bottom view showing a configuration of a frame and a substrate according to a third variant of the first embodiment.

FIG. 12 is a bottom view showing a configuration of a frame 311 and a substrate 340 according to a third variant of the first embodiment.

FIG. 12 also shows the substrate 340 and the frame 311 according to the present variant together with a rotary shaft 2 and a resin member 30 in the same manner as in FIG. 9 described above. A configuration similar to the above-described first embodiment is denoted with the same reference sign.

In the third variant, contacted portions 311j, 311k of the frame 311 are projecting portions. In other words, two projecting portions 311j, 311k are provided in an inner peripheral portion 11a of the frame 311. The projecting portions 311j, 311k are provided in the contacted portions. The projecting portions 311j, 311k project toward an outer peripheral portion 41 of the substrate 340 in a radial direction. Furthermore, contact portions 349j, 349k are side surfaces of the outer peripheral portion 41 of the substrate 340 curved along the inner peripheral portion 11a of the frame 311 in the circumferential direction. The projecting portions 311j, 311k may be formed, for example, by pushing a part of the frame 311 in the radial direction, or may be formed by attaching protruding small pieces or the like to the inner peripheral portion 11a of the frame 311.

Relative to an annular contour of the inner peripheral portion 11a of the frame 311, each of the projecting portions 311j, 311k is formed to project toward an outer peripheral portion 41 side of the substrate 340. The projecting portion 311j and the projecting portion 311k are present at positions away from each other in the circumferential direction. The projecting portions 311j, 311k are unevenly distributed in the circumferential direction. In the substrate 340, the contact portions 349j, 349k and a recessed part 44 are unevenly distributed in regions different from one another in the circumferential direction. In other words, the contact portions 349j, 349k are present at positions comparatively away from three recessed parts 44 in the circumferential direction.

Specifically, as shown in FIG. 12, the projecting portion 311j is disposed via a space of, for example, about 80 degrees from the projecting portion 311k in the circumferential direction. A recessed part 44c closest to the projecting portion 49j is disposed via a space of, for example, 80 degrees from the projecting portion 49j in the circumferential direction. Furthermore, a recessed part 44a closest to the projecting portion 49k is disposed via a space of, for example, 120 degrees from the projecting portion 49k in the circumferential direction.

Thus, the projecting portions 311j, 311k contacting the substrate 340 are provided on a frame 311 side, and the substrate 340 may contact the projecting portions 311j, 311k, to be biased. Consequently, a sensor 53 can be disposed in the same manner as in the above-described embodiment. The number of the projecting portions to be provided in a contacted portion of the frame 311 is not limited to two, and may be one or three or more.

Figure 13:
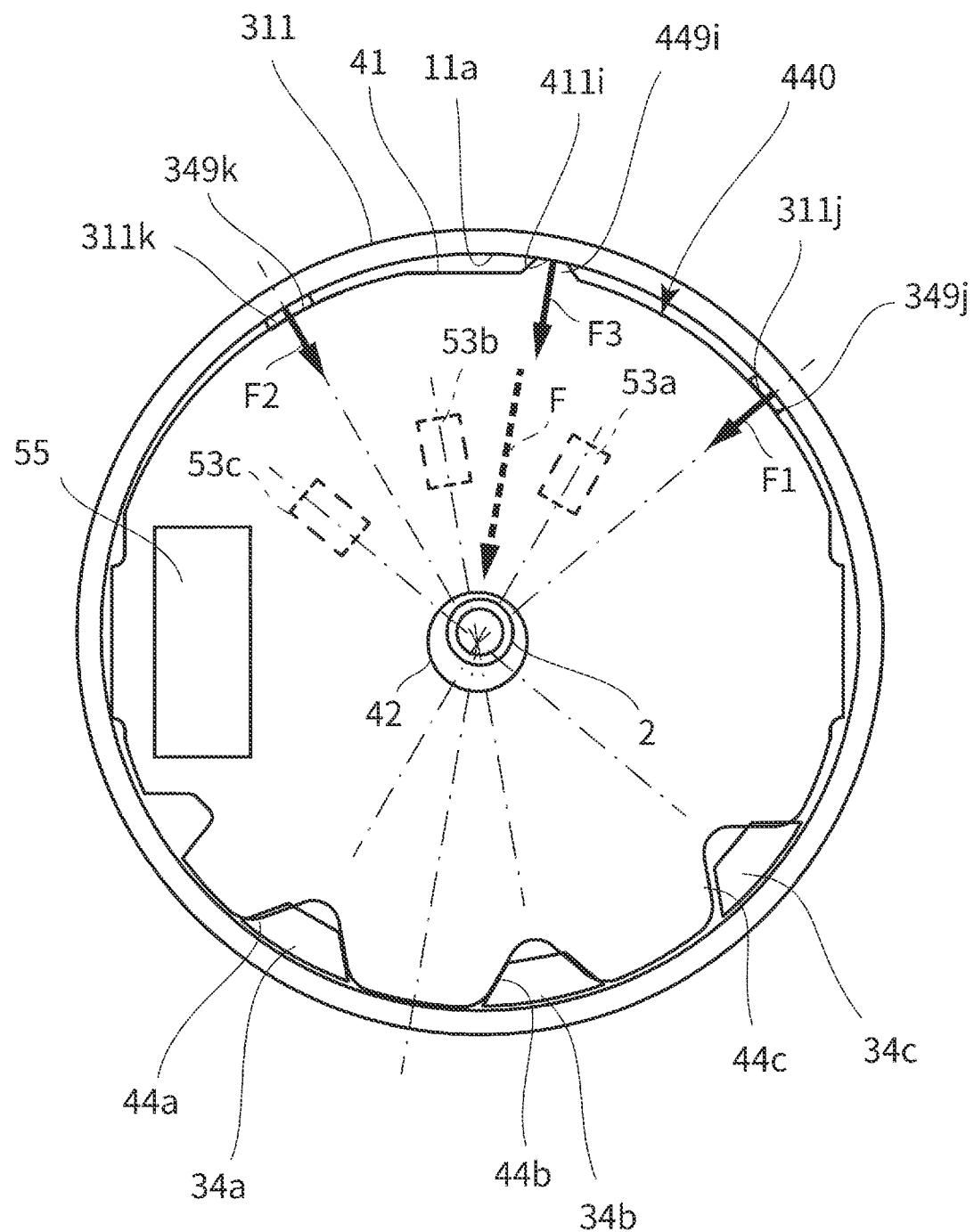
FIG. 13 A bottom view showing a configuration of a frame and a substrate according to a fourth variant of the first embodiment.

FIG. 13 is a bottom view showing a configuration of a frame 311 and a substrate 440 according to a fourth variant of the first embodiment.

FIG. 13 also shows the substrate 440 and the frame 411 according to the present variant together with a rotary shaft 2 and a resin member 30 in the same manner as in FIG. 9 described above. A configuration similar to the above-described first embodiment and each variant is denoted with the same reference sign.

In the first embodiment, projecting portions may be formed in both a contact portion and a contacted portion.

In the fourth variant, the frame 311 similar to the third variant is provided. In the frame 311, contacted portions 311j, 311k being projecting portions are provided, and in the substrate 440, contact portions 349j, 349k are provided in the same manner as in the substrate 340. Furthermore, in the substrate 440, a contact portion 449i being a projecting portion projecting toward an inner peripheral portion 11a of the frame 311 is provided in a radial direction, and a part of the inner peripheral portion 11a of the frame 311 contacting the contact portion 449i is a contacted portion 411i. In other words, in the substrate 440, a first projecting portion 449i projecting toward the frame 311 and regions 349j, 349k contacting second projecting portions 311j, 311k of the frame 311 are provided as contact portions. Furthermore, in the frame 311, the second projecting portions 311j, 311k projecting toward the substrate 440 and a region 411i contacting the first projecting portion 449i of the substrate 440 are provided as contacted portions.

In the present embodiment, the first projecting portion 449i of the contact portion and the second projecting portions 311j, 311k of the contacted portions are present at positions different from one another in a circumferential direction. The first projecting portion 449i is provided between the second projecting portions 311j and 311k. When seen from downside, the second projecting portion 311j, the first projecting portion 449i and the second projecting portion 311k are arranged in this order in a counterclockwise direction and almost equally spaced in the circumferential direction.

As described above, in the fourth variant, the substrate 440 contacts the frame 311 at three locations. At the respective contact locations, a biasing force acts on the substrate 440 by the frame 311 (arrows F1, F2 and F3), and as shown with an arrow F, the substrate 440 is biased with a force obtained by synthesizing the respective biasing forces. Therefore, a sensor 53 can be disposed in the same manner as in the first embodiment.

Figure 14:
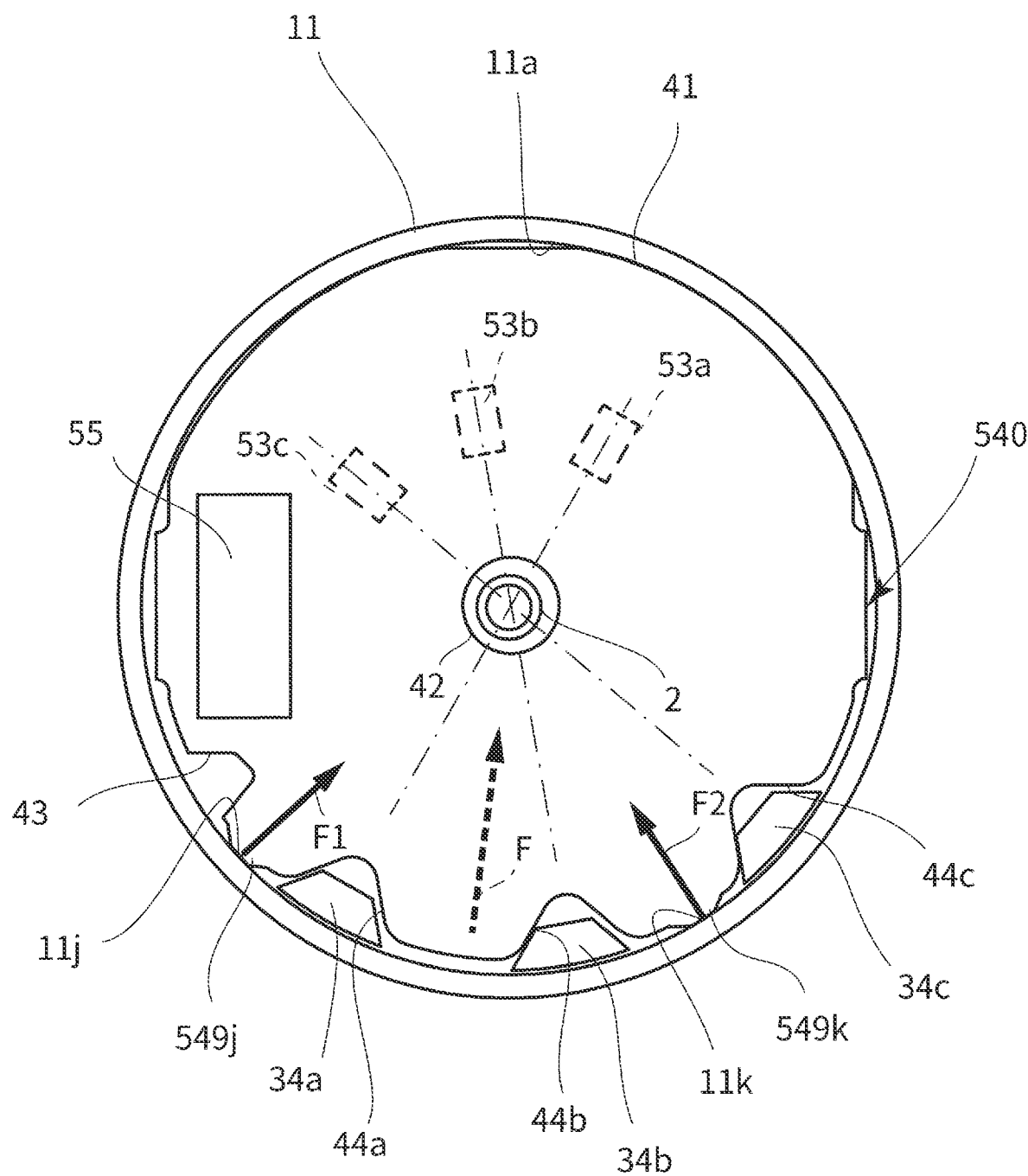
FIG. 14 A bottom view showing a configuration of a substrate according to a fifth variant of the first embodiment.

FIG. 14 is a bottom view showing a configuration of a substrate 540 according to a fifth variant of the first embodiment.

FIG. 14 also shows the substrate 540 according to the present variant together with a rotary shaft 2, a frame 11, and a resin member 30 in the same manner as in FIG. 9 described above. A configuration similar to the above-described first embodiment and each variant is denoted with the same reference sign.

As shown in FIG. 14, the substrate 540 has contact portions 549 (a projecting portion 549j and a projecting portion 549k) different in position from the contact portions 49 of the above-described substrate 40. Another configuration of the substrate 540 is similar to the above-described substrate 40.

In the fifth variant, the contact portions 549 are provided on a side provided with three recessed parts 44. The projecting portion 549j is provided in an outer peripheral portion 41 between a common line wiring part 43 and a recessed part 44a. The projecting portion 549k is provided in the outer peripheral portion 41 between a recessed part 44b and a recessed part 44c. Relative to an annular contour of the outer peripheral portion 41 of the substrate 540, the projecting portions 549*j*, 549*k* are formed to project toward an inner peripheral portion 11*a* side of the frame 11.

In the fifth variant, the substrate 540 is biased by the frame 11, and pushed against the inner peripheral portion 11*a* of the frame 11. The substrate 540 is biased toward a portion of the frame 11 on a side opposite to a portion close to a protruding part 34, and the substrate is positioned to the frame 11 with a part of the outer peripheral portion 41 of the substrate 540 contacting the inner peripheral portion 11*a* of the frame 11. Consequently, the substrate 540 is located at a position biased to the frame 11.

Thus, also in the fifth variant, a sensor 53 can be disposed at a desired position. Furthermore, as shown in FIG. 14, the protruding part 34 of the resin member 30 is present inside the recessed part 44 of the substrate 540 also with the substrate 540 being biased. Therefore, the substrate 540 is positioned in a circumferential direction.

In the above-described first embodiment, the protruding part 34 of the resin member 30 may have another shape such as a columnar shape.

Second Embodiment

A basic configuration of a motor 1 in a second embodiment is the same as the basic configuration in the first embodiment, and hence the description is not repeated here. Hereinafter, a configuration similar to the first embodiment will be denoted with the same reference sign and described.

The second embodiment is different from the first embodiment due to a conductor guide section 736 to wire a conductor 27 toward a land 47 being formed in a lower end portion of a protruding part 34.

Figure 15:
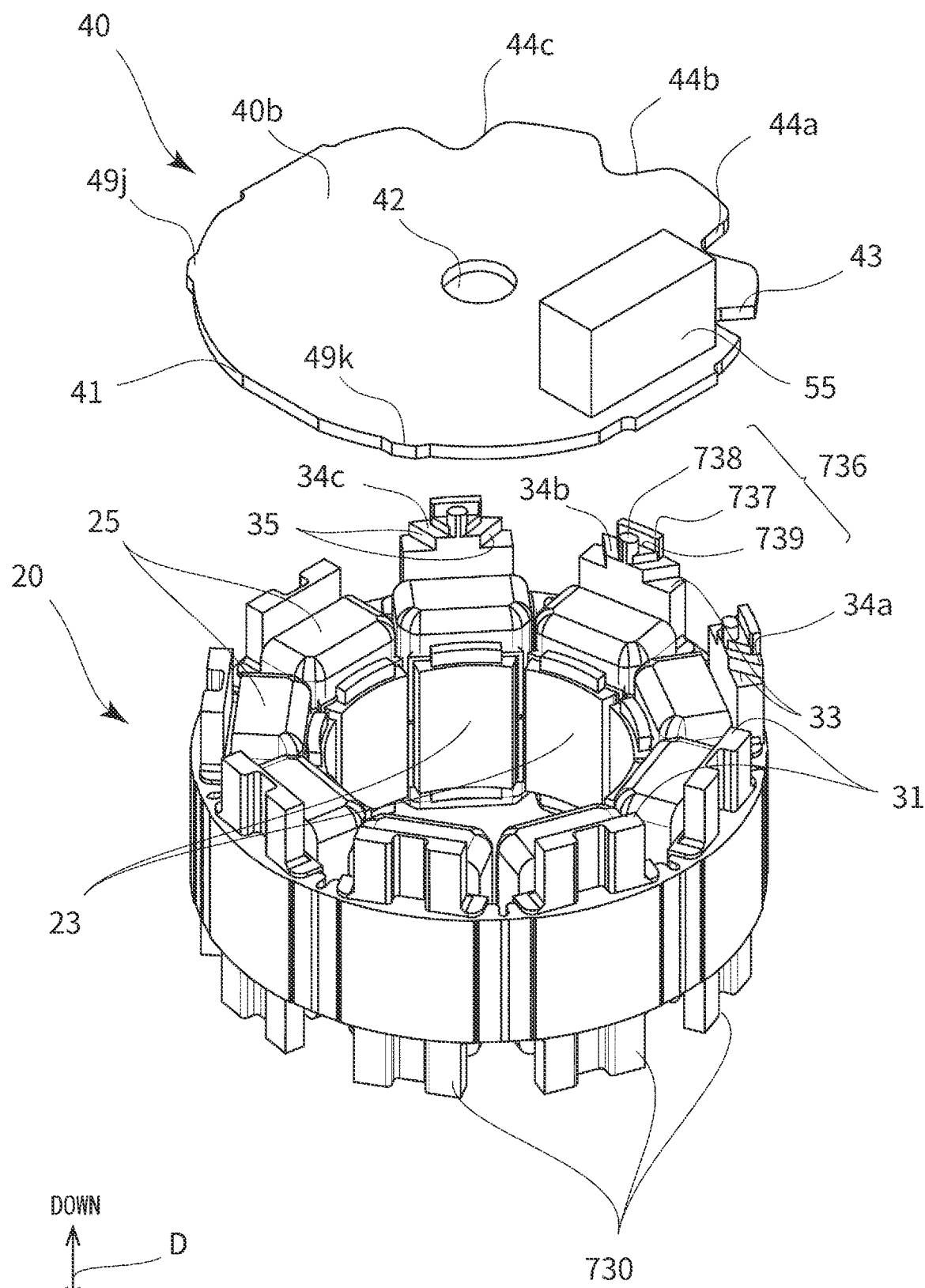
FIG. 15 An exploded downward perspective view showing a structure of a stator and a substrate according to a second embodiment.
Figure 16:
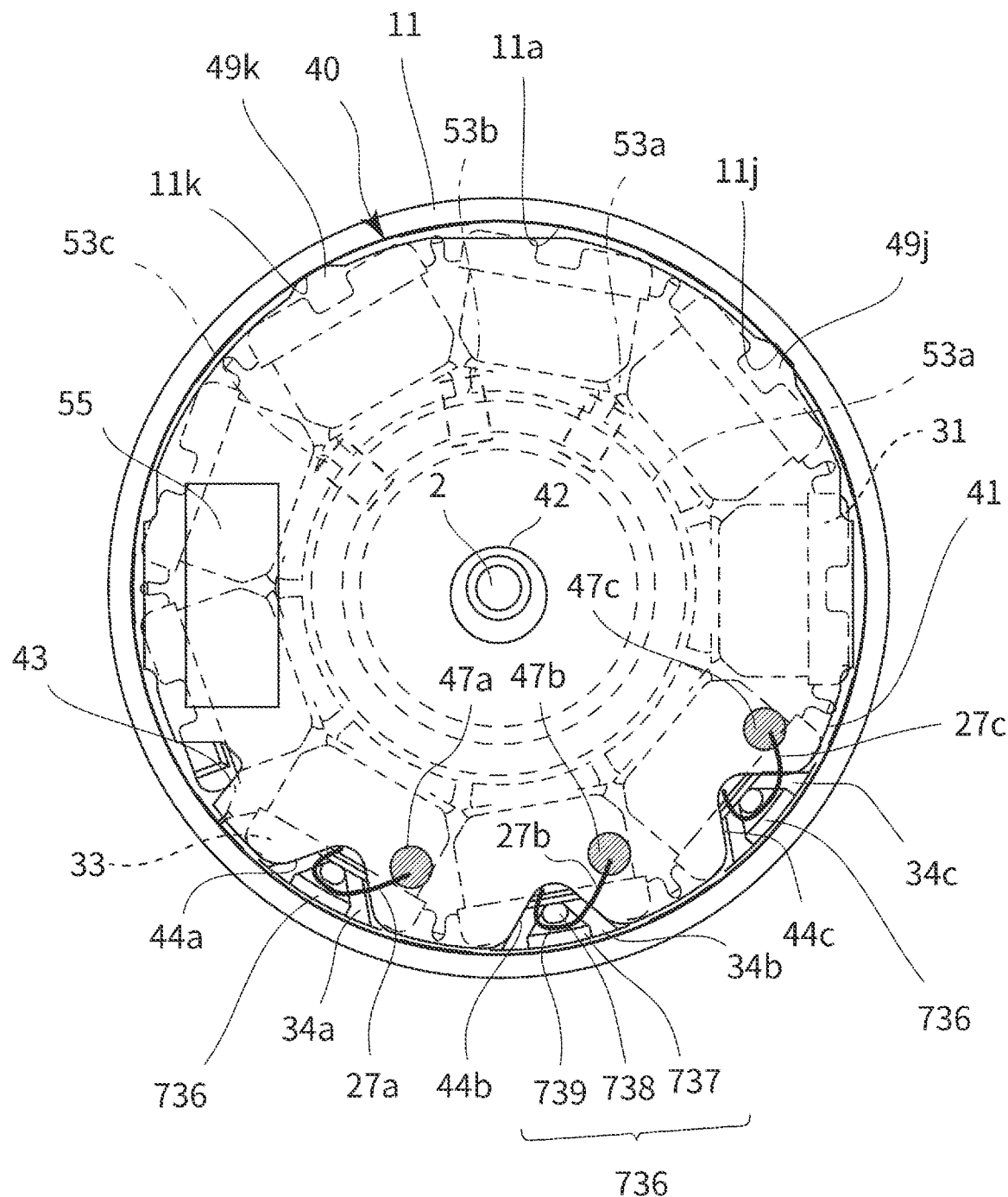
FIG. 16 A bottom view showing an attaching structure of the substrate of a motor according to the second embodiment.
Figure 17:
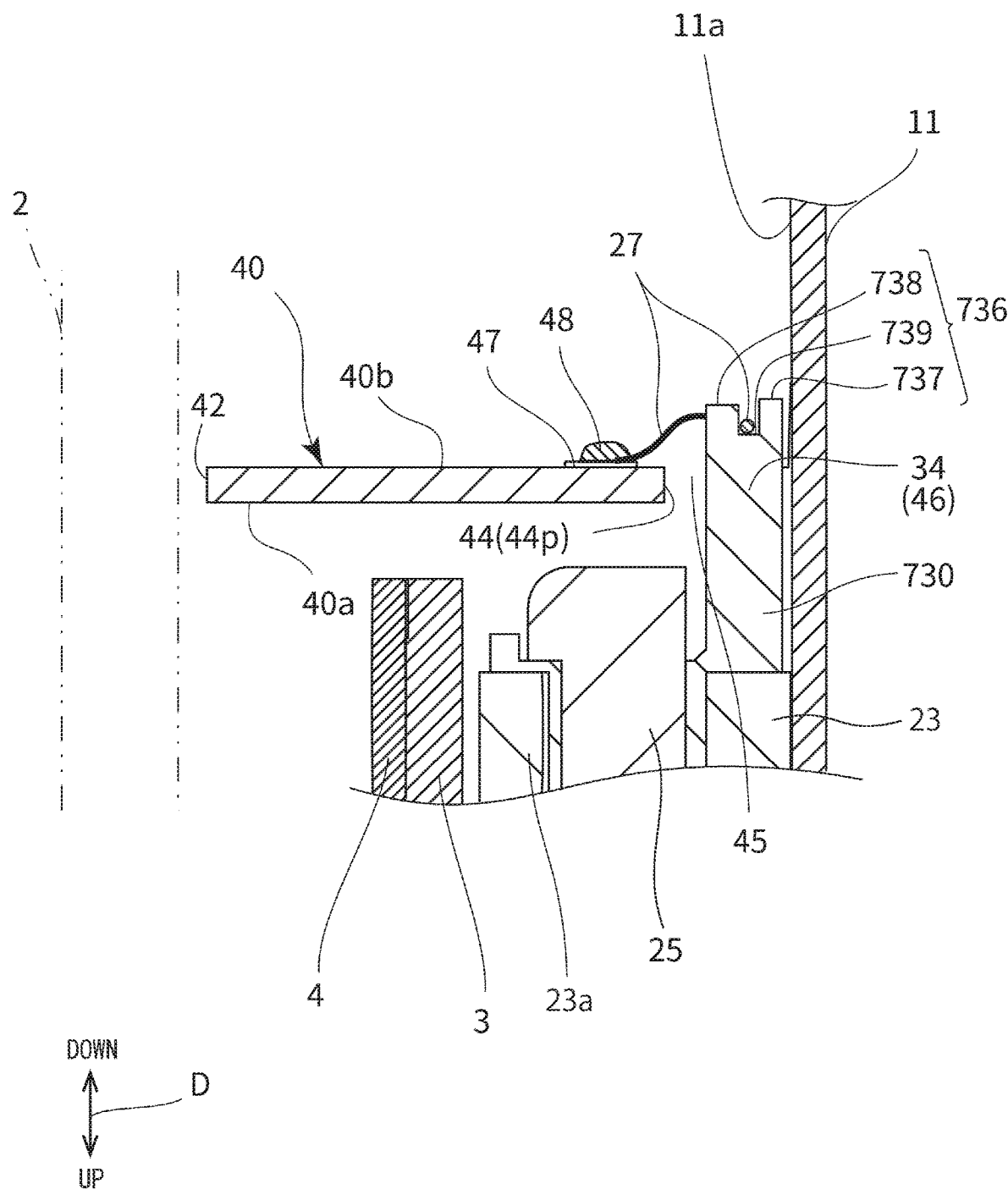
FIG. 17 An end face view showing a schematic structure of a portion, a protruding part according to the second embodiment being provided at the portion.
Figure 18:
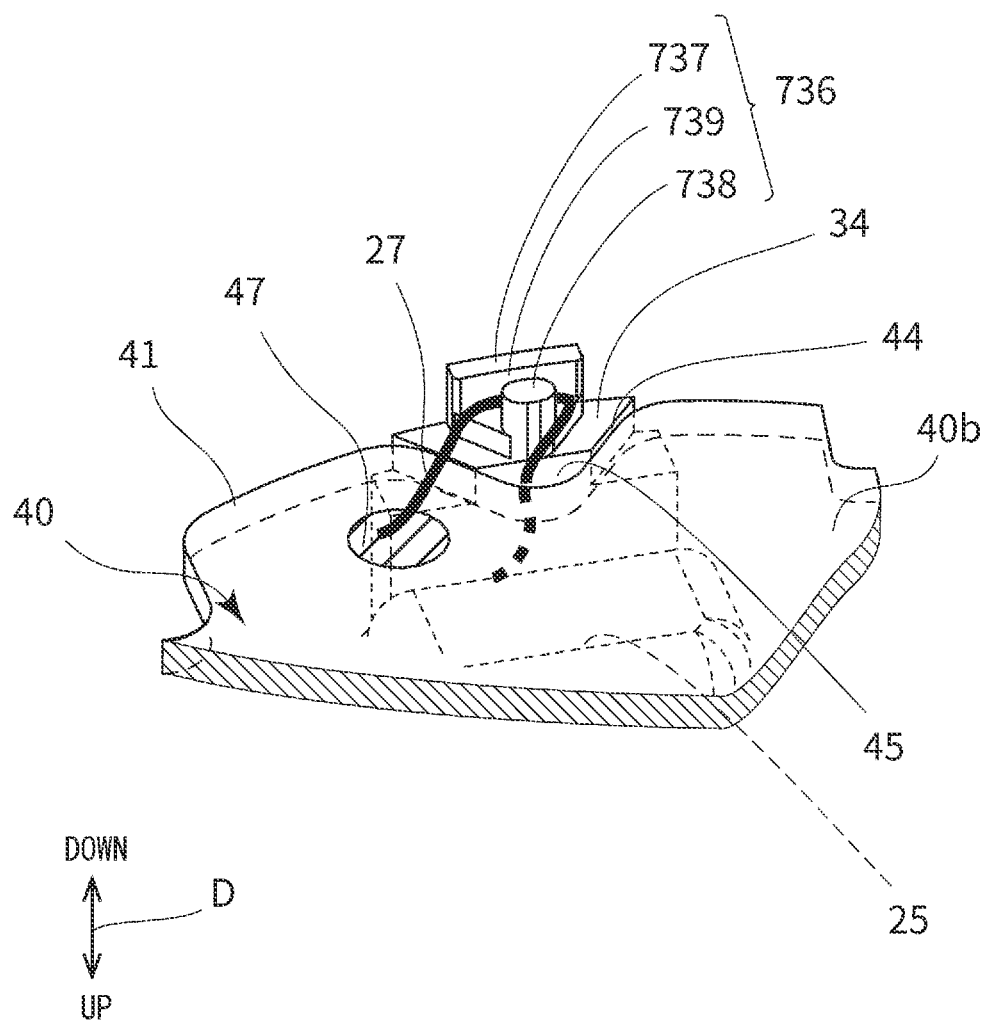
FIG. 18 A perspective view showing a portion, a recessed part being provided at the portion.

FIG. 15 is an exploded downward perspective view showing a structure of a stator 20 and a substrate 40 according to a second embodiment. FIG. 16 is a bottom view showing an attaching structure of the substrate 40 of the motor 1 according to the second embodiment. FIG. 17 is an end face view showing a schematic structure of a portion including the protruding part 34 according to the second embodiment. FIG. 18 is a perspective view showing a portion including a recessed part 44.

FIG. 15 is depicted in the same manner as in FIG. 5 described above. FIG. 16 is depicted in the same manner as in FIG. 6 described above. FIG. 17 is depicted in the same manner as in FIG. 7 described above. In FIG. 15, drawing of the conductor 27 is omitted. Except for FIG. 17, drawing of a conductive member 48 is omitted.

In the second embodiment, the protruding part 34 is provided in a part of a resin member 730 of the stator 20 in the same manner as in the resin member 30 according to the first embodiment. As shown in FIG. 16, protruding parts 34 are provided at three locations, and each protruding part is disposed inside the recessed part 44 of the substrate 40. Three lands 47 provided on a lower surface 40*b* of the substrate 40 are provided adjacent to three recessed parts 44 in a circumferential direction, respectively. In other words, the protruding part 34 and the land 47 corresponding to each phase are arranged in the circumferential direction.

In each of the three protruding parts 34, the conductor guide section 736 is provided. The conductor guide section 736 projects downward from a lower end face of the protruding part 34.

As shown in FIG. 18, the conductor guide section 736 has a first protrusion 737 and a second protrusion 738. The first protrusion 737 is provided close to an inner peripheral portion 11*a* of a frame 11. The first protrusion 737 has a wall shape extending in the circumferential direction. The second protrusion 738 is provided on an inner side of the first protrusion 737 in a radial direction (a position close to the rotary shaft 2). The second protrusion 738 has a column shape shorter than the first protrusion 737 in the circumferential direction. The second protrusion 738 has a rounded side peripheral surface. In the second protrusion 738, for example, a cross section vertical to a rotary shaft direction has a columnar shape such as an elliptic shape or a track shape.

FIG. 17 shows a cross section passing the first protrusion 737 and the second protrusion 738. As shown in FIG. 17, the second protrusion 738 is provided via a space away from the first protrusion 737 in the radial direction. Consequently, in the conductor guide section 736, a groove-like recess 739 is formed with the first protrusion 737 and the second protrusion 738 as side walls. The recess 739 extends in the circumferential direction. A dimension of the recess 739 in the radial direction is slightly larger than a thickness of the conductor 27.

As shown in FIG. 18, in the second embodiment, the conductor 27 drawn through a gap 45 from an upper surface 40*a* side to a lower surface 40*b* side of the substrate 40 (from the stator 20 to the lower surface 40*b* side) is entangled with the conductor guide section 736 to pass over the recess 739, and is wired toward the land 47 adjacent to the conductor guide section 736 in the circumferential direction. In other words, the conductor 27 is wired with a part of the conductor being arranged inside the recesses 739, and is guided to the land 47. Then, the conductor is connected to the land 47 by use of the conductive member 48.

Thus, in the second embodiment, since the conductor 27 is entangled with the conductor guide section 736, force or vibration to be transmitted to the conductor 27 is not easily transmitted to a connecting portion of the conductor 27 to the land 47. Therefore, reliability of connection of the conductor 27 to the land 47 can improve. Furthermore, even when the motor 1 vibrates, the conductor 27 can be prevented from contacting the stator 20, the substrate 40 or the like and being disconnected.

Furthermore, in the second embodiment, an operation of connecting the conductor 27 to the land 47 can be performed with the conductor 27 being guided to the land 47 by the conductor guide section 736. Therefore, the motor 1 can be easily manufactured.

The second protrusion 738 has a smaller dimension in the circumferential direction than the first protrusion 737. Therefore, the conductor 27 drawn downward from the gap 45 present on the inner side of the second protrusion 738 can be easily entangled with the recess 739. Furthermore, even when a position of the land 47 is slightly closer to the rotary shaft 2 than a position of the recess 739, the conductor 27 passing the recess 739 can be easily guided inward and wired to the land 47. The side peripheral surface of the second protrusion 738 is rounded. Consequently, a bend radius of the conductor 27 to be wired can be easily maintained at a certain radius or more, and the conductor 27 can be prevented from being damaged.

Others

A motor may be configured by appropriately combining a configuration of a part of the above-described first embodiment including the variants with a configuration of a part of the second embodiment.

The number of slots of the stator, a configuration of the resin member, a shape or a configuration of the substrate and the like are not limited to the above-described embodiments.

There are not any restrictions on a type of motor. For example, the motor may be a brushless motor or another motor.

The above embodiments should be considered illustrative and not restrictive in all respects. The scope of the present invention is not indicated by the above description but is indicated by the claims, and meanings equivalent to the claims and all changes in the scope are intended to be included.

LIST OF REFERENCE SIGNS 1 motor
2 rotary shaft
2a rotor
3 magnet
10 housing
11 and 311 frame
11a inner peripheral portion
11j, 11k, 311i, 311j, 311k, and 411i contacted portion
20 stator
23 stator core
23a teeth
25 coil
27 (27a, 27b and 27c) conductor
30 and 730 resin member (insulator)
34 (34a, 34b and 34c) protruding part
35 outer surface
40, 140, 240, 340, 440 and 540 substrate
40a upper surface
40b lower surface
41 outer peripheral portion
44 (44a, 44b and 44c) recessed part
45 gap (one example of an unoccupied region)
46 occupied region
47 (47a, 47b and 47c) land
48 conductive member
49, 149, 249, 349j, 349k and 549 contact portion
49j, 49k, 149j, 149k, 249j, 449i, 549j, and 549k projecting portion
53 (53a, 53b and 53c) sensor
736 conductor guide section
737 first protrusion
738 second protrusion
739 recess

The invention claimed is:

1. A motor comprising:
a conductor;
a stator including an insulator, a stator core, and a coil wound around the stator core via the insulator, the coil being disposed inside an outer peripheral portion of the stator core;
a rotor, the rotor being surrounded with the stator; and
a substrate including an outer peripheral portion having an outer edge, and an upper surface and a lower surface in an insulator side in a rotary shaft direction, the upper surface and the lower surface being surrounded with the outer edge of the substrate, wherein
a portion of the lower surface of the substrate at the outer peripheral portion of the substrate contacts with and overlaps a portion of the insulator in the rotary shaft direction, the portion of the insulator being disposed between the lower surface at the outer peripheral portion of the substrate and the outer peripheral portion of the stator core in the rotary shaft direction,
a protruding part extending in the rotary shaft direction is provided at the portion of the insulator, the protruding part being formed with a part of the insulator,
the outer peripheral portion of the substrate includes a recessed part recessed in a radial direction,
the protruding part is present inside the recessed part,
a land is provided at the upper surface of the substrate,
the conductor is electrically connected to the land by a conductive member, wherein inside the recessed part, a gap surrounded with a surface directed inward in the radial direction and an edge of the recessed part is present, an outer surface of the protruding part including the surface directed inward in the radial direction, and
a part of the conductor passes through the gap and is away from the surface directed inward in the radial direction and the edge of the recessed part.

2. The motor according to claim 1, wherein a part of the outer surface of the protruding part extends along an edge of the recessed part.

3. The motor according to claim 1, wherein the protruding part is a positioning part of the substrate.

4. The motor according to claim 1, wherein the portion of the insulator extends beyond the stator core in the rotary shaft direction.

5. The motor according to claim 1, wherein the conductive member is provided at the upper surface of the substrate.

6. The motor according to claim 1, wherein the stator core includes teeth extending in the radial direction.

7. The motor according to claim 1, wherein an upper surface of the coil is higher than the outer peripheral portion of the stator core in the rotary shaft direction.

8. The motor according to claim 1, wherein a shape of the recessed part is a tapered shape.

9. The motor according to claim 1, wherein a part of a contour of the recessed part opposes the conductor and the protruding part in a circumferential direction.

10. The motor according to claim 1, wherein a part of the conductor connected to the coil and the land is free from the protruding part.

11. The motor according to claim 1, wherein the recessed part includes a shape having an end portion and a contour extending toward the end portion, and wherein the gap is surrounded with the outer surface of the protruding part and the end portion of the recessed part.

12. The motor according to claim 1, wherein an occupied region occupied by the protruding part in a region inside the recessed part is larger than an unoccupied region not occupied by the protruding part in the region inside the recessed part.

13. The motor according to claim 12, wherein a width of the unoccupied region is smaller than a width of the land in the radial direction.

14. The motor according to claim 1, wherein the protruding part and the land are arranged in a circumferential direction,
a conductor guide section is provided in a top of the protruding part, and
a part of the conductor passes through a recess of the conductor guide section.

15. The motor according to claim 14, wherein the recess extends in the circumferential direction.

16. The motor according to claim 1, wherein
the insulator includes a protruding part extending in the rotary shaft direction,
an outer surface of the protruding part extends along a edge of the recessed part.

17. The motor according to claim 1, wherein
the conductor passes through a gap between the recessed part and the protruding part.

18. The motor according to claim 1, comprising:
a connector disposed at the annular substrate, wherein
the connector and the land are arranged in a circumferential direction,
the connector and the land are arranged at the annular substrate.

19. A motor comprising:
a frame;
a stator including a conductor, an insulator, a coil connected to the conductor;
an annular substrate including outer peripheral portion and a land;
a rotor opposed the annular substrate;
a sensor provided at the annular substrate;
an outer peripheral portion of the annular substrate includes a recessed part recessed in a radial direction and a contact portion contacting the inner peripheral portion of the frame,
an inner peripheral portion of the frame includes a contacted portion contacting the outer peripheral portion of the substrate,
the contact portion projects toward the contacted portion,
the contacted portion projects toward the contact portion,
the conductor passing through the recessed part is electrically connected to the land by a conductive member.

* * * * *